US012748580B2

(12) United States Patent
Madhur et al.

(10) Patent No.: US 12,748,580 B2
(45) Date of Patent: Sep. 29, 2026

(54) AUTHORIZATION IDENTIFIERS WITH EXECUTABLE CODE BLOCKS

(71) Applicant: NUTANIX, INC., San Jose, CA (US)

(72) Inventors: Amitesh Madhur, Fremont, CA (US); Shubham Kumar, San Jose, CA (US); Divya Venkatachalam, San Jose, CA (US); Praveen Yedlapalli, Austin, TX (US)

(73) Assignee: NUTANIX, INC., San Jose, CA (US)

( * ) Notice: Subject to any disclaimer, the term of this patent is extended or adjusted under 35 U.S.C. 154(b) by 281 days.

(21) Appl. No.: 18/428,651

(22) Filed: Jan. 31, 2024

(65) Prior Publication Data

US 2025/0181332 A1 Jun. 5, 2025

Related U.S. Application Data

(60) Provisional application No. 63/606,362, filed on Dec. 5, 2023.

(51) Int. Cl.
*G06F 8/41* (2018.01)
*G06F 9/54* (2006.01)

(52) U.S. Cl.
CPC ................ *G06F 8/42* (2013.01); *G06F 9/541* (2013.01)

(58) Field of Classification Search
CPC .................................. G06F 9/541; G06F 8/42
See application file for complete search history.

(56) References Cited

U.S. PATENT DOCUMENTS 6,529,943 B1 * 3/2003 Ohi ..................... G06F 16/9535 709/206
8,549,518 B1 10/2013 Aron et al.
8,601,473 B1 12/2013 Aron et al.
(Continued)

FOREIGN PATENT DOCUMENTS

CN 111538977 A * 8/2020 ............. G06F 21/44
CN 113821783 A * 12/2021 ......... G06F 16/2455
DE 102014119363 A1 * 6/2015 ............. H04L 47/70

OTHER PUBLICATIONS

Poitras, Steven. "The Nutanix Bible" (Oct. 15, 2013), from http://stevenpoitras.com/the-nutanix-bible/ (Publication date based on indicated capture date by Archive.org; first publication date unknown); pp. all.

(Continued)

*Primary Examiner* — Phillip H Nguyen
(74) *Attorney, Agent, or Firm* — Artegis Law Group, LLP

(57) ABSTRACT

Techniques using authorization identifiers with code blocks include one or more non-transitory computer-readable media storing program instructions that, when executed by one or more processors of an authorization server, cause the one or more processors to perform a method including receiving, from an application programming interface (API) server, an authorization request, the authorization request including an API authorization identifier; determining whether the API authorization identifier is valid; and in response to determining that the API authorization identifier is valid: executing a code block in the API authorization identifier; adding an output generated by the execution of the code block to a response to the authorization request; and returning the response to the API server.

36 Claims, 11 Drawing Sheets

(56) References Cited

U.S. PATENT DOCUMENTS

| | | | | |
|---|---|---|---|---|
| 8,782,744 | B1 | 7/2014 | Fuller et al. | |
| 8,850,130 | B1 | 9/2014 | Aron et al. | |
| 8,863,124 | B1 | 10/2014 | Aron | |
| 9,009,106 | B1 | 4/2015 | Aron et al. | |
| 9,069,708 | B2 | 6/2015 | Gill et al. | |
| 9,336,132 | B1 | 5/2016 | Aron et al. | |
| 9,652,265 | B1 | 5/2017 | Narayanasamy et al. | |
| 9,747,287 | B1 | 8/2017 | Bhardwaj et al. | |
| 9,772,866 | B1 | 9/2017 | Aron et al. | |
| 9,823,950 | B1 * | 11/2017 | Carrier | G06F 9/543 |
| 11,178,128 | B2 | 11/2021 | Poschel et al. | |
| 2010/0146291 | A1 * | 6/2010 | Anbuselvan | H04L 63/123 707/E17.014 |
| 2012/0167121 | A1 | 6/2012 | Reierson et al. | |
| 2014/0136346 | A1 * | 5/2014 | Teso | G06Q 10/40 705/14.72 |
| 2015/0092233 | A1 * | 4/2015 | Park | H04N 1/00244 358/1.15 |
| 2016/0014084 | A1 | 1/2016 | Hansen | |
| 2017/0199766 | A1 * | 7/2017 | Wagner | G06F 9/44521 |
| 2017/0228711 | A1 * | 8/2017 | Chawla | G06Q 20/384 |
| 2017/0366551 | A1 | 12/2017 | Brandwine | |
| 2018/0083971 | A1 | 3/2018 | Brown et al. | |
| 2018/0129816 | A1 * | 5/2018 | Schmidt | H04L 63/0272 |
| 2020/0322324 | A1 | 10/2020 | Chang et al. | |
| 2021/0233126 | A1 * | 7/2021 | Weerapurage | H04L 41/5051 |
| 2023/0058273 | A1 * | 2/2023 | Sundar | H04L 9/14 |
| 2023/0067552 | A1 | 3/2023 | Caudill et al. | |

OTHER PUBLICATIONS

Poitras, Steven. "The Nutanix Bible" (Jan. 11, 2014), from http://stevenpoitras.com/the-nutanix-bible/ (Publication date based on indicated capture date by Archive.org; first publication date unknown); pp. all.

Poitras, Steven. "The Nutanix Bible" (Jun. 20, 2014), from http://stevenpoitras.com/the-nutanix-bible/ (Publication date based on indicated capture date by Archive. org; first publication date unknown); pp. all.

Poitras, Steven. "The Nutanix Bible" (Jan. 7, 2015), from http://stevenpoitras.com/the-nutanix-bible/ (Publication date based on indicated capture date by Archive.org; first publication date unknown); pp. all.

Poitras, Steven. "The Nutanix Bible" (Jun. 9, 2015), from http://stevenpoitras.com/the-nutanix-bible/ (Publication date based on indicated capture date by Archive.org; first publication date unknown); pp. all.

Poitras, Steven. "The Nutanix Bible" (Sep. 4, 2015), from https://nutanixbible.com/; pp. all.

Poitras, Steven. "The Nutanix Bible" (Jan. 12, 2016), from https://nutanixbible.com/ ; pp. all.

Poitras, Steven. "The Nutanix Bible" (Jun. 9, 2016), from https://nutanixbible.com/; pp. all.

Poitras, Steven. "The Nutanix Bible" (Jan. 3, 2017), from https://nutanixbible.com/; pp. all.

Poitras, Steven. "The Nutanix Bible" (Jun. 8, 2017), from https://nutanixbible.com/; pp. all.

Poitras, Steven. "The Nutanix Bible" (Jan. 3, 2018), from https://nutanixbible.com/; pp. all.

Poitras, Steven. "The Nutanix Bible" (Jun. 25, 2018), from https://nutanixbible.com/; pp. all.

Poitras, Steven. "The Nutanix Bible" (Jan. 8, 2019), from https://nutanixbible.com/; pp. all.

Poitras, Steven. "The Nutanix Bible" (Jul. 25, 2019), from https://nutanixbible.com/; pp. all.

Poitras, Steven. "The Nutanix Bible" (Sep. 17, 2019), from https://nutanixbible.com/; pp. all.

Cano, Ignacio et al. "Curator: Self-Managing Storage for Enterprise Clusters"; University of Washington; published Mar. 2017; pp. all.

Poitras, Steven. "The Nutanix Bible" (Mar. 2, 2020), from https://nutanixbible.com/; pp. all.

Poitras, Steven. "The Nutanix Bible" (Sep. 1, 2020), from https://nutanixbible.com/; pp. all.

Ctirix Validated Solutions, "Citrix XenDesktop 7.1 on Microsoft Hyper-V Server 2012 R2 on Nutanix Virtual Computing Platform Solution Design", Prepared by: Citrix Validated Solutions, Jun. 25, 2014.

Poitras, Steven et al., The Nutanix Bible—Classic Edition, Jan. 3, 2024, 282 pages, https://www.nutanixbible.com/pdf/classic.pdf.

"Configure Logical API for Multiple APIs", https://auth0.com/docs/get-started/apis/set-logical-api, Nov. 21, 2023, 10 pages.

"Google scripts API", https://developers.google.com/apps-script/api/concepts, Nov. 21, 2023, 2 pages.

"How to execute Script API faster", https://www.akana.com/blog/api-script, Nov. 21, 2023, 8 pages.

Zhong et al., "Distributed Blockchain-Based Authentication and Authorization Protocol for Smart Grid", https://www.hindawi.com/journals/wcmc/2021/5560621/, Feb. 19, 2021, 15 pages.

"Authenticate for using client libraries" https://cloud.google.com/docs/authentication/client-libraries, Jan. 25, 2024, 3 pages.

"Authenticate by using API keys" https://cloud.google.com/docs/authentication/api-keys#using-with-client-libs, Jan. 25, 2024, 12 pages.

"Client-side Integrations with Custom API Keys", https://www.serviceobjects.com/blog/client-side-integrations-with-custom-api-keys/, Feb. 4, 2021, 7 pages.

Forshaw, Aden, "A Brief Guide on How & Why to Secure API Keys", https://theauthapi.com/articles/a-brief-guide-on-how-why-to-secure-api-keys/, May 11, 2022, 12 pages.

"Manage API keys", https://docs.coveo.com/en/1718/manage-an-organization/manage-api-keys, Jan. 25, 2024, 9 pages.

"How to Use API Keys", https://coding-boot-camp.github.io/full-stack/apis/how-to-use-api-keys, Nov. 14, 2023, 8 pages.

Extended European Search Report for Application No. 24217492.8 dated Mar. 31, 2025.

* cited by examiner

AUTHORIZATION IDENTIFIERS WITH EXECUTABLE CODE BLOCKS

CROSS-REFERENCE TO RELATED APPLICATIONS

This application claims the benefit of the United States Provisional Patent Application titled "AUTHORIZATION IDENTIFIERS WITH EXECUTABLE CODE BLOCKS," filed Dec. 5, 2023, and having Ser. No. 63/606,362. The subject matter of this related application is hereby incorporated herein by reference.

BACKGROUND

Field of the Various Embodiments

Embodiments of the present invention relate generally to computing services, and, more specifically, to authorization identifiers with executable code blocks.

Description of the Related Art

The landscape of digital security and access management has evolved progressively, from simple passwords to multi-factor authentication, to meet the demands of an increasingly interconnected computing environment. Conventional authentication systems typically use authorization identifiers, such as passwords, tokens, and/or the like, which are used to provision computing devices, computing clusters in the cloud, and/or the like. The authorization identifiers can also be used to establish trust between computing devices and/or trust between groups of computing devices.

In the realm of cloud computing and distributed systems, application programming interfaces (APIs), have become ubiquitous, facilitating secure interactions between disparate services and applications. Servers often provide APIs that fulfill requests involving one or more services. For example, when a user of a client device requests an operation involving the service, the client device sends a request that is formatted according to the API. The server receives the request and validates the contents, such as verifying that the request meets the formatting requirements of the API.

End users and/or client devices also use authorization identifiers to invoke APIs. As part of the authorization process, when an end user and/or client devices sends a request to an API server to access a function within an API, the request includes an authorization identifier, such as an API key, along with the request. The API server then sends a request to an authorization server to validate the API key and in response to the API server receiving a confirmation that the API key is valid, the API server performs the requested service. This authorization approach using conventional authorization identifiers, such as API keys, can be used when the end user or client makes the API call directly or uses a user interface that makes the API call in response to interactions with the user interface.

However, conventional authorization identifiers face notable challenges. One drawback is that conventional authorization identifiers, such as API keys, are primarily designed for basic authentication purposes and lack the functionality to directly handle sophisticated requests, such as retrieving business data that the authentication server has access to. Typically, to obtain the business data, a user must make multiple API calls: one to authenticate and other calls to request and retrieve the specific data needed. Making multiple API calls not only complicates the user's workflow but also increases the burden on the network and the authorization server, potentially leading to inefficiencies and increased latency. For example, a user wishing to access a series of customer records and transaction histories has to initiate separate API calls for each category of data, even though the initial authentication call confirms the user's access rights.

As the foregoing indicates, what is needed in the art are more effective authorization identifiers with executable code blocks.

SUMMARY

In various embodiments, one or more non-transitory computer-readable media storing program instructions that, when executed by one or more processors of an authorization server, cause the one or more processors to perform a method including receiving, from an application programming interface (API) server, an authorization request, the authorization request including an API authorization identifier; determining whether the API authorization identifier is valid; and in response to determining that the API authorization identifier is valid: executing a code block in the API authorization identifier; adding an output generated by the execution of the code block to a response to the authorization request; and returning the response to the API server.

In various embodiments, one or more non-transitory computer-readable media storing program instructions that, when executed by one or more processors of a client device, cause the one or more processors to perform a method including selecting an API authorization identifier; adding an executable code block to the API authorization identifier; transmitting an application programming interface (API) request to an API server; receiving a response from the API server, the response including output from execution of the executable code block; and processing the output from the execution of the executable code block.

In various embodiments, an application programming interface (API) authorization identifier includes an authorization key and a block of executable code.

Further embodiments provide, among other things, methods and system for implementing one or more of the disclosed techniques.

At least one technical advantage of the disclosed techniques over the prior art is that, with the disclosed techniques, API authorization identifiers are able to include executable code blocks. The techniques allow for a more efficient interaction between the user and the authorization server, by facilitating direct and complex data requests within a single API call. After implementation, the disclosed techniques allow the user to bypass the multiple API calls conventionally required for different data accesses, streamlining the data retrieval process and significantly reducing the network and server load. Further, the disclosed techniques allow for an API management, which introduces a means for real-time data processing within the authorization process. These technical advantages represent one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, can be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

Figure 1A:
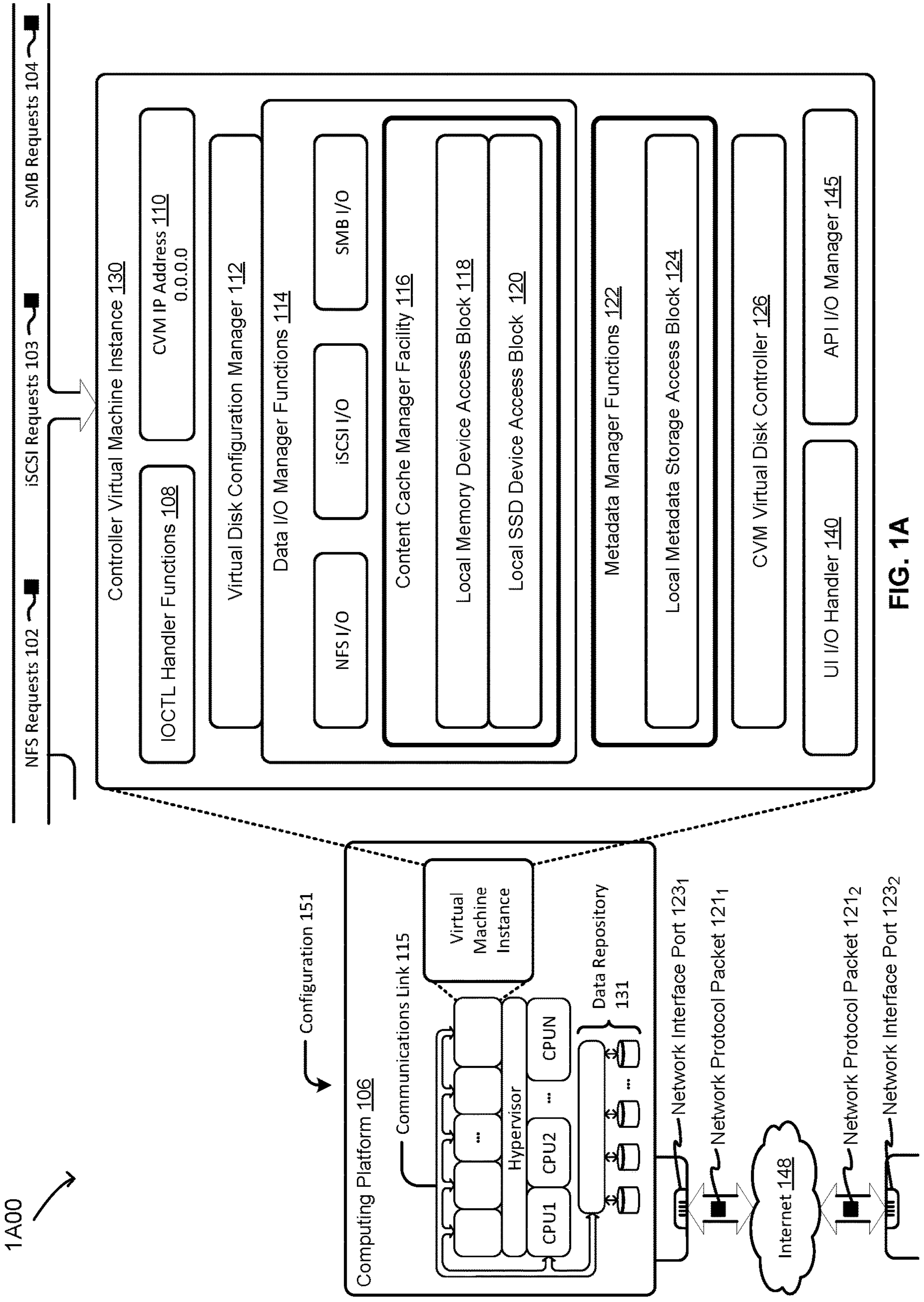
FIGS. 1A-1D are block diagrams illustrating virtualization system architectures configured to implement one or more aspects of the present embodiments.

In the following description, numerous specific details are set forth to provide a more thorough understanding of the various embodiments. However, it will be apparent to one of skill in the art that the inventive concepts may be practiced without one or more of these specific details.

Exemplary Virtualization System Architectures

According to some embodiments, all or portions of any of the foregoing techniques can be partitioned into one or more modules and instances within, or as, or in conjunction with a virtualized controller in a virtual computing environment. Some example instances within various virtual computing environments are shown and discussed in further detail in FIGS. 1A-1D. Consistent with these embodiments, a virtualized controller includes a collection of software instructions that serve to abstract details of underlying hardware or software components from one or more higher-level processing entities. In some embodiments, a virtualized controller can be implemented as a virtual machine, as an executable container, or within a layer (e.g., such as a layer in a hypervisor). Consistent with these embodiments, distributed systems include collections of interconnected components that are designed for, or dedicated to, storage operations as well as being designed for, or dedicated to, computing and/or networking operations.

In some embodiments, interconnected components in a distributed system can operate cooperatively to achieve a particular objective such as to provide high-performance computing, high-performance networking capabilities, and/or high-performance storage and/or high-capacity storage capabilities. For example, a first set of components of a distributed computing system can coordinate to efficiently use a set of computational or compute resources, while a second set of components of the same distributed computing system can coordinate to efficiently use the same or a different set of data storage facilities.

In some embodiments, a hyperconverged system coordinates the efficient use of compute and storage resources by and between the components of the distributed system. Adding a hyperconverged unit to a hyperconverged system expands the system in multiple dimensions. As an example, adding a hyperconverged unit to a hyperconverged system can expand the system in the dimension of storage capacity while concurrently expanding the system in the dimension of computing capacity and also in the dimension of networking bandwidth. Components of any of the foregoing distributed systems can comprise physically and/or logically distributed autonomous entities.

In some embodiments, physical and/or logical collections of such autonomous entities can sometimes be referred to as nodes. In some hyperconverged systems, compute and storage resources can be integrated into a unit of a node. Multiple nodes can be interrelated into an array of nodes, which nodes can be grouped into physical groupings (e.g., arrays) and/or into logical groupings or topologies of nodes (e.g., spoke-and-wheel topologies, rings, etc.). Some hyperconverged systems implement certain aspects of virtualization. For example, in a hypervisor-assisted virtualization environment, certain of the autonomous entities of a distributed system can be implemented as virtual machines. As another example, in some virtualization environments, autonomous entities of a distributed system can be implemented as executable containers. In some systems and/or environments, hypervisor-assisted virtualization techniques and operating system virtualization techniques are combined.

FIG. 1A is a block diagram illustrating virtualization system architecture 1A00 configured to implement one or more aspects of the present embodiments. As shown in FIG. 1A, virtualization system architecture 1A00 includes a collection of interconnected components, including a controller virtual machine (CVM) instance 130 in a configuration 151. Configuration 151 includes a computing platform 106 that supports virtual machine instances that are deployed as user virtual machines, or controller virtual machines or both. Such virtual machines interface with a hypervisor (as shown). In some examples, virtual machines can include processing of storage I/O (input/output or IO) as received from any or every source within the computing platform. An example implementation of such a virtual machine that processes storage I/O is depicted as CVM instance 130.

In this and other configurations, a CVM instance receives block I/O storage requests as network file system (NFS) requests in the form of NFS requests 102, internet small computer storage interface (iSCSI) block IO requests in the form of iSCSI requests 103, Samba file system (SMB) requests in the form of SMB requests 104, and/or the like. The CVM instance publishes and responds to an internet protocol (IP) address (e.g., CVM IP address 110). Various forms of input and output can be handled by one or more IO control handler functions (e.g., IOCTL handler functions 108) that interface to other functions such as data IO manager functions 114 and/or metadata manager functions 122. As shown, the data IO manager functions can include communication with virtual disk configuration manager 112 and/or can include direct or indirect communication with any of various block IO functions (e.g., NFS IO, iSCSI IO, SMB IO, etc.).

In addition to block IO functions, configuration 151 supports IO of any form (e.g., block IO, streaming IO, packet-based IO, HTTP traffic, etc.) through either or both of a user interface (UI) handler such as UI IO handler 140 and/or through any of a range of application programming interfaces (APIs), possibly through API IO manager 145.

Communications link 115 can be configured to transmit (e.g., send, receive, signal, etc.) any type of communications packets comprising any organization of data items. The data items can comprise a payload data, a destination address (e.g., a destination IP address) and a source address (e.g., a source IP address), and can include various packet processing techniques (e.g., tunneling), encodings (e.g., encryption), formatting of bit fields into fixed-length blocks or into variable length fields used to populate the payload, and/or the like. In some cases, packet characteristics include a version identifier, a packet or payload length, a traffic class, a flow label, etc. In some cases, the payload comprises a data structure that is encoded and/or formatted to fit into byte or word boundaries of the packet.

In some embodiments, hard-wired circuitry can be used in place of, or in combination with, software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

Computing platform 106 includes one or more computer readable media that is capable of providing instructions to a data processor for execution. In some examples, each of the computer readable media can take many forms including, but not limited to, non-volatile media and volatile media. Non-volatile media includes any non-volatile storage medium, for example, solid state storage devices (SSDs) or optical or magnetic disks such as hard disk drives (HDDs) or hybrid disk drives, or random-access persistent memories (RAPMs) or optical or magnetic media drives such as paper tape or magnetic tape drives. Volatile media includes dynamic memory such as random-access memory (RAM). As shown, controller virtual machine instance 130 includes content cache manager facility 116 that accesses storage locations, possibly including local dynamic random-access memory (DRAM) (e.g., through local memory device access block 118) and/or possibly including accesses to local solid-state storage (e.g., through local SSD device access block 120).

Common forms of computer readable media include any non-transitory computer readable medium, for example, floppy disk, flexible disk, hard disk, magnetic tape, or any other magnetic medium; CD-ROM or any other optical medium; punch cards, paper tape, or any other physical medium with patterns of holes; or any RAM, PROM, EPROM, FLASH-EPROM, or any other memory chip or cartridge. Any data can be stored, for example, in any form of data repository 131, which in turn can be formatted into any one or more storage areas, and which can comprise parameterized storage accessible by a key (e.g., a filename, a table name, a block address, an offset address, etc.). Data repository 131 can store any forms of data and can comprise a storage area dedicated to storage of metadata pertaining to the stored forms of data. In some cases, metadata can be divided into portions. Such portions and/or cache copies can be stored in the storage data repository and/or in a local storage area (e.g., in local DRAM areas and/or in local SSD areas). Such local storage can be accessed using functions provided by local metadata storage access block 124. The data repository 131 can be configured using CVM virtual disk controller 126, which can in turn manage any number or any configuration of virtual disks.

Execution of a sequence of instructions to practice certain of the disclosed embodiments is performed by one or more instances of a software instruction processor, or a processing element such as a data processor, or such as a central processing unit (e.g., CPU1, CPU2, . . . , CPUN). According to certain embodiments of the disclosure, two or more instances of configuration 151 can be coupled by communications link 115 (e.g., backplane, LAN, PSTN, wired or wireless network, etc.) and each instance can perform respective portions of sequences of instructions as can be required to practice embodiments of the disclosure.

The shown computing platform 106 is interconnected to the Internet 148 through one or more network interface ports (e.g., network interface port 1231 and network interface port 1232). Configuration 151 can be addressed through one or more network interface ports using an IP address. Any operational element within computing platform 106 can perform sending and receiving operations using any of a range of network protocols, possibly including network protocols that send and receive packets (e.g., network protocol packet 1211 and network protocol packet 1212).

Computing platform 106 can transmit and receive messages that can be composed of configuration data and/or any other forms of data and/or instructions organized into a data structure (e.g., communications packets). In some cases, the data structure includes program instructions (e.g., application code) communicated through the Internet 148 and/or through any one or more instances of communications link 115. Received program instructions can be processed and/or executed by a CPU as it is received and/or program instructions can be stored in any volatile or non-volatile storage for later execution. Program instructions can be transmitted via an upload (e.g., an upload from an access device over the Internet 148 to computing platform 106). Further, program instructions and/or the results of executing program instructions can be delivered to a particular user via a download (e.g., a download from computing platform 106 over the Internet 148 to an access device).

Configuration 151 is merely one example configuration. Other configurations or partitions can include further data processors, and/or multiple communications interfaces, and/or multiple storage devices, etc. within a partition. For example, a partition can bound a multi-core processor (e.g., possibly including embedded or collocated memory), or a partition can bound a computing cluster having a plurality of computing elements, any of which computing elements are connected directly or indirectly to a communications link. A first partition can be configured to communicate to a second partition. A particular first partition and a particular second partition can be congruent (e.g., in a processing element array) or can be different (e.g., comprising disjoint sets of components).

A cluster is often embodied as a collection of computing nodes that can communicate between each other through a local area network (e.g., LAN or virtual LAN (VLAN)) or a backplane. Some clusters are characterized by assignment of a particular set of the aforementioned computing nodes to access a shared storage facility that is also configured to communicate over the local area network or backplane. In many cases, the physical bounds of a cluster are defined by a mechanical structure such as a cabinet or such as a chassis or rack that hosts a finite number of mounted-in computing units. A computing unit in a rack can take on a role as a server, or as a storage unit, or as a networking unit, or any combination therefrom. In some cases, a unit in a rack is dedicated to provisioning of power to other units. In some cases, a unit in a rack is dedicated to environmental conditioning functions such as filtering and movement of air through the rack and/or temperature control for the rack. Racks can be combined to form larger clusters. For example, the LAN of a first rack having a quantity of 32 computing nodes can be interfaced with the LAN of a second rack having 16 nodes to form a two-rack cluster of 48 nodes. The former two LANs can be configured as subnets, or can be configured as one VLAN. Multiple clusters can communicate between one module to another over a WAN (e.g., when geographically distal) or a LAN (e.g., when geographically proximal).

In some embodiments, a module can be implemented using any mix of any portions of memory and any extent of hard-wired circuitry including hard-wired circuitry embodied as a data processor. Some embodiments of a module include one or more special-purpose hardware components (e.g., power control, logic, sensors, transducers, etc.). A data processor can be organized to execute a processing entity that is configured to execute as a single process or configured to execute using multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

Some embodiments of a module include instructions that are stored in a memory for execution so as to facilitate operational and/or performance characteristics pertaining to management of block stores. Various implementations of the data repository comprise storage media organized to hold a series of records and/or data structures.

Further details regarding general approaches to managing data repositories are described in U.S. Pat. No. 8,601,473 titled "ARCHITECTURE FOR MANAGING I/O AND STORAGE FOR A VIRTUALIZATION ENVIRONMENT," issued on Dec. 3, 2013, which is hereby incorporated by reference in its entirety.

Further details regarding general approaches to managing and maintaining data in data repositories are described in U.S. Pat. No. 8,549,518 titled "METHOD AND SYSTEM FOR IMPLEMENTING A MAINTENANCE SERVICE FOR MANAGING I/O AND STORAGE FOR A VIRTUALIZATION ENVIRONMENT," issued on Oct. 1, 2013, which is hereby incorporated by reference in its entirety.

Figure 1B:
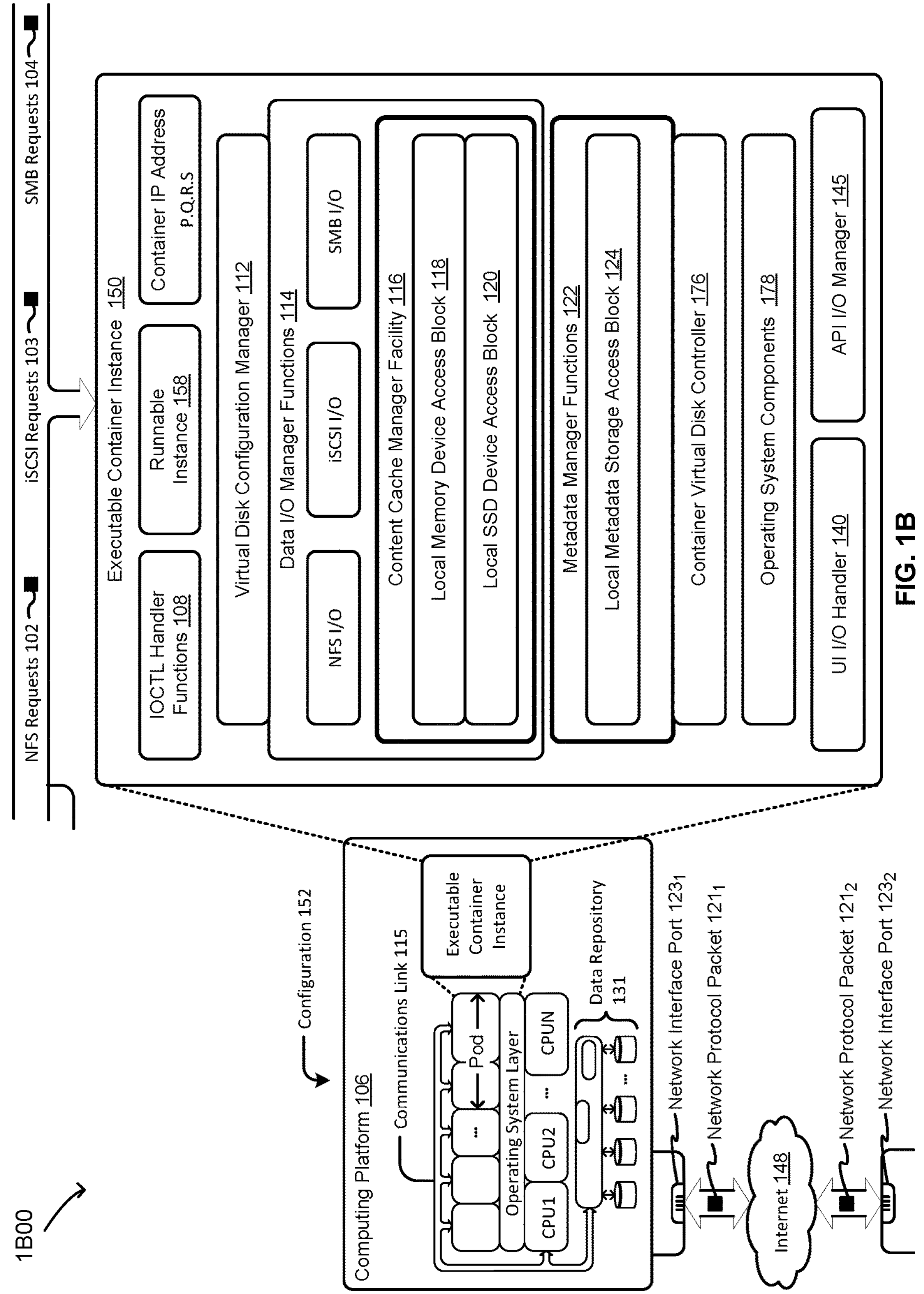

FIG. 1B depicts a block diagram illustrating another virtualization system architecture 1B00 configured to implement one or more aspects of the present embodiments. As shown in FIG. 1B, virtualization system architecture 1B00 includes a collection of interconnected components, including an executable container instance 150 in a configuration 152. Configuration 152 includes a computing platform 106 that supports an operating system layer (as shown) that performs addressing functions such as providing access to external requestors (e.g., user virtual machines or other processes) via an IP address (e.g., "P.Q.R.S", as shown). Providing access to external requestors can include implementing all or portions of a protocol specification (e.g., "http:") and possibly handling port-specific functions. In some embodiments, external requestors (e.g., user virtual machines or other processes) rely on the aforementioned addressing functions to access a virtualized controller for performing all data storage functions. Furthermore, when data input or output requests are received from a requestor running on a first node are received at the virtualized controller on that first node, then in the event that the requested data is located on a second node, the virtualized controller on the first node accesses the requested data by forwarding the request to the virtualized controller running at the second node. In some cases, a particular input or output request might be forwarded again (e.g., an additional or Nth time) to further nodes. As such, when responding to an input or output request, a first virtualized controller on the first node might communicate with a second virtualized controller on the second node, which second node has access to particular storage devices on the second node or, the virtualized controller on the first node can communicate directly with storage devices on the second node.

The operating system layer can perform port forwarding to any executable container (e.g., executable container instance 150). An executable container instance can be executed by a processor. Runnable portions of an executable container instance sometimes derive from an executable container image, which in turn might include all, or portions of any of, a Java archive repository (JAR) and/or its contents, and/or a script or scripts and/or a directory of scripts, and/or a virtual machine configuration, and can include any dependencies therefrom. In some cases, a configuration within an executable container might include an image comprising a minimum set of runnable code. Contents of larger libraries and/or code or data that would not be accessed during runtime of the executable container instance can be omitted from the larger library to form a smaller library composed of only the code or data that would be accessed during runtime of the executable container instance. In some cases, start-up time for an executable container instance can be much faster than start-up time for a virtual machine instance, at least inasmuch as the executable container image might be much smaller than a respective virtual machine instance. Furthermore, start-up time for an executable container instance can be much faster than start-up time for a virtual machine instance, at least inasmuch as the executable container image might have many fewer code and/or data initialization steps to perform than a respective virtual machine instance.

An executable container instance can serve as an instance of an application container or as a controller executable container. Any executable container of any sort can be rooted in a directory system and can be configured to be accessed by file system commands (e.g., "ls" or "ls-a", etc.). The executable container might optionally include operating system components 178, however such a separate set of operating system components need not be provided. As an alternative, an executable container can include runnable instance 158, which is built (e.g., through compilation and linking, or just-in-time compilation, etc.) to include all of the library and OS-like functions needed for execution of the runnable instance. In some cases, a runnable instance can be built with a virtual disk configuration manager, any of a variety of data IO management functions, etc. In some cases, a runnable instance includes code for, and access to, container virtual disk controller 176. Such a container virtual disk controller can perform any of the functions that the aforementioned CVM virtual disk controller 126 can perform, yet such a container virtual disk controller does not rely on a hypervisor or any particular operating system so as to perform its range of functions.

In some environments, multiple executable containers can be collocated and/or can share one or more contexts. For example, multiple executable containers that share access to a virtual disk can be assembled into a pod (e.g., a Kubernetes pod). Pods provide sharing mechanisms (e.g., when multiple executable containers are amalgamated into the scope of a pod) as well as isolation mechanisms (e.g., such that the namespace scope of one pod does not share the namespace scope of another pod).

Figure 1C:
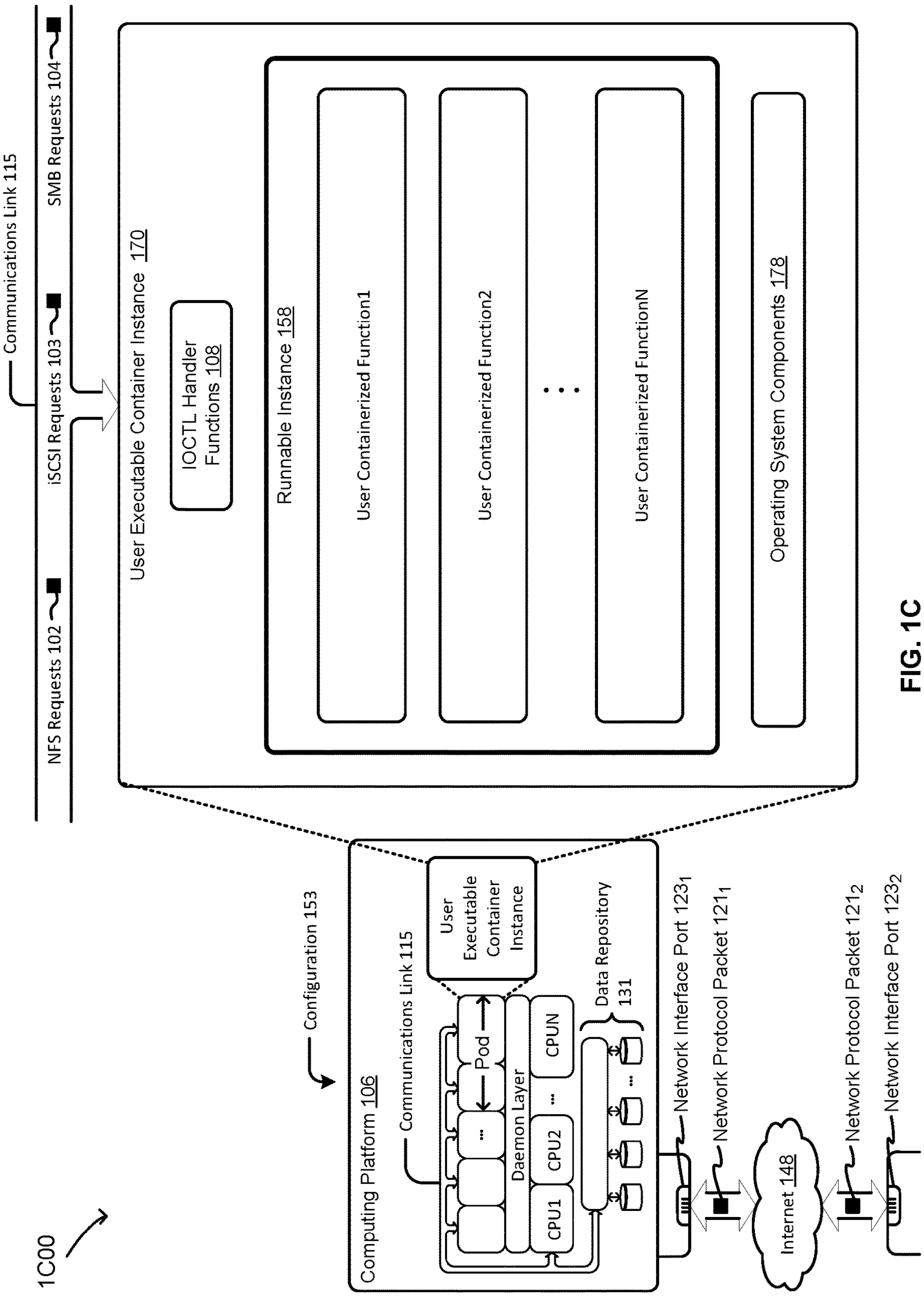

FIG. 1C is a block diagram illustrating virtualization system architecture 1C00 configured to implement one or more aspects of the present embodiments. As shown in FIG. 1C, virtualization system architecture 1C00 includes a collection of interconnected components, including a user executable container instance in configuration 153 that is further described as pertaining to user executable container instance 170. Configuration 153 includes a daemon layer (as shown) that performs certain functions of an operating system.

User executable container instance 170 comprises any number of user containerized functions (e.g., user containerized function1, user containerized function2, . . . , user containerized functionN). Such user containerized functions can execute autonomously or can be interfaced with or wrapped in a runnable object to create a runnable instance (e.g., runnable instance 158). In some cases, the shown operating system components 178 comprise portions of an operating system, which portions are interfaced with or included in the runnable instance and/or any user containerized functions. In some embodiments of a daemon-assisted containerized architecture, computing platform 106 might or might not host operating system components other than operating system components 178. More specifically, the shown daemon might or might not host operating system components other than operating system components 178 of user executable container instance 170.

In some embodiments, the virtualization system architecture 1A00, 1B00, and/or 1C00 can be used in any combination to implement a distributed platform that contains multiple servers and/or nodes that manage multiple tiers of storage where the tiers of storage might be formed using the shown data repository 131 and/or any forms of network accessible storage. As such, the multiple tiers of storage can include storage that is accessible over communications link 115. Such network accessible storage can include cloud storage or networked storage (e.g., a SAN or storage area network). Unlike prior approaches, the disclosed embodiments permit local storage that is within or directly attached to the server or node to be managed as part of a storage pool. Such local storage can include any combinations of the aforementioned SSDs and/or HDDs and/or RAPMs and/or hybrid disk drives. The address spaces of a plurality of storage devices, including both local storage (e.g., using node-internal storage devices) and any forms of network-accessible storage, are collected to form a storage pool having a contiguous address space.

Significant performance advantages can be gained by allowing the virtualization system to access and utilize local (e.g., node-internal) storage. This is because I/O performance is typically much faster when performing access to local storage as compared to performing access to networked storage or cloud storage. This faster performance for locally attached storage can be increased even further by using certain types of optimized local storage devices such as SSDs or RAPMs, or hybrid HDDs, or other types of high-performance storage devices.

In some embodiments, each storage controller exports one or more block devices or NFS or iSCSI targets that appear as disks to user virtual machines or user executable containers. These disks are virtual since they are implemented by the software running inside the storage controllers. Thus, to the user virtual machines or user executable containers, the storage controllers appear to be exporting a clustered storage appliance that contains some disks. User data (including operating system components) in the user virtual machines resides on these virtual disks.

In some embodiments, any one or more of the aforementioned virtual disks can be structured from any one or more of the storage devices in the storage pool. In some embodiments, a virtual disk is a storage abstraction that is exposed by a controller virtual machine or container to be used by another virtual machine or container. In some embodiments, the virtual disk is exposed by operation of a storage protocol such as iSCSI or NFS or SMB. In some embodiments, a virtual disk is mountable. In some embodiments, a virtual disk is mounted as a virtual storage device.

In some embodiments, some or all of the servers or nodes run virtualization software. Such virtualization software might include a hypervisor (e.g., as shown in configuration 151) to manage the interactions between the underlying hardware and user virtual machines or containers that run client software.

Distinct from user virtual machines or user executable containers, a special controller virtual machine (e.g., as depicted by controller virtual machine instance 130) or as a special controller executable container is used to manage certain storage and I/O activities. Such a special controller virtual machine is sometimes referred to as a controller executable container, a service virtual machine (SVM), a service executable container, or a storage controller. In some embodiments, multiple storage controllers are hosted by multiple nodes. Such storage controllers coordinate within a computing system to form a computing cluster.

The storage controllers are not formed as part of specific implementations of hypervisors. Instead, the storage controllers run above hypervisors on the various nodes and work together to form a distributed system that manages all of the storage resources, including the locally attached storage, the networked storage, and the cloud storage. In example embodiments, the storage controllers run as special virtual machines-above the hypervisors-thus, the approach of using such special virtual machines can be used and implemented within any virtual machine architecture. Furthermore, the storage controllers can be used in conjunction with any hypervisor from any virtualization vendor and/or implemented using any combinations or variations of the aforementioned executable containers in conjunction with any host operating system components.

Figure 1D:
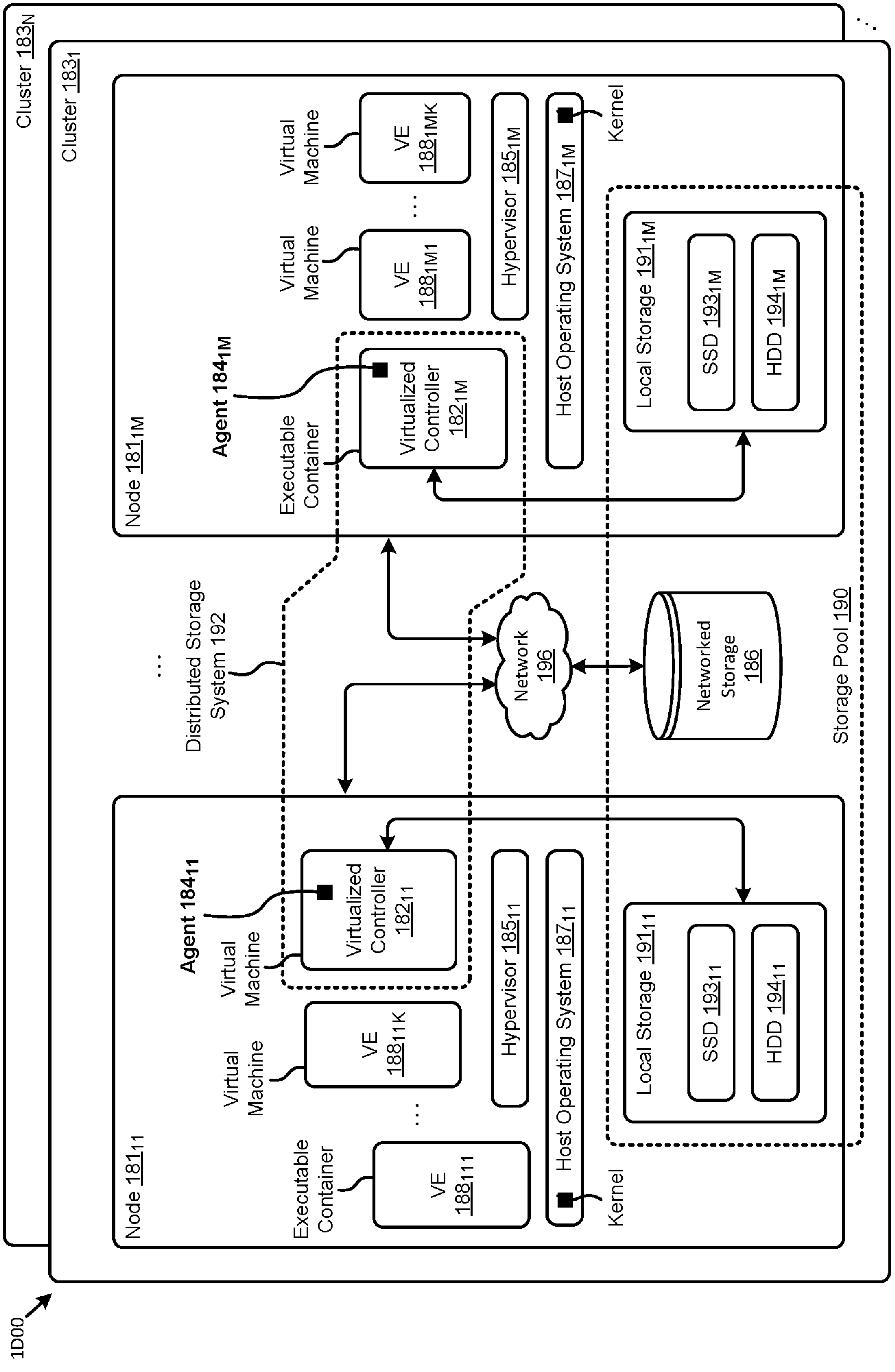

FIG. 1D is a block diagram illustrating virtualization system architecture 1D00 configured to implement one or more aspects of the present embodiments. As shown in FIG. 1D, virtualization system architecture 1D00 includes a distributed virtualization system that includes multiple clusters (e.g., cluster $\mathbf{183}_1$, . . . , cluster $\mathbf{183}_N$) comprising multiple nodes that have multiple tiers of storage in a storage pool. Representative nodes (e.g., node $\mathbf{181}_{11}$, . . . , node $\mathbf{181}_{1M}$) and storage pool 190 associated with cluster $\mathbf{183}_1$ are shown. Each node can be associated with one server, multiple servers, or portions of a server. The nodes can be associated (e.g., logically and/or physically) with the clusters. As shown, the multiple tiers of storage include storage that is accessible through a network 196, such as a networked storage 186 (e.g., a storage area network or SAN, network attached storage or NAS, etc.). The multiple tiers of storage further include instances of local storage (e.g., local storage $\mathbf{191}_{11}$, . . . , local storage $\mathbf{191}_{1M}$). For example, the local storage can be within or directly attached to a server and/or appliance associated with the nodes. Such local storage can include solid state drives (SSD $\mathbf{193}_{11}$, . . . , SSD $\mathbf{193}_{1M}$), hard disk drives (HDD $\mathbf{194}_{11}$, . . . , HDD $\mathbf{194}_{1M}$), and/or other storage devices.

As shown, any of the nodes of the distributed virtualization system can implement one or more user virtualized entities (e.g., VE $\mathbf{188}^{111}$, . . . , VE $\mathbf{188}^{11K}$, . . . , VE $\mathbf{188}^{1M1}$, . . . , VE $\mathbf{188}^{1MK}$), such as virtual machines (VMs) and/or executable containers. The VMs can be characterized as software-based computing "machines" implemented in a container-based or hypervisor-assisted virtualization environment that emulates the underlying hardware resources (e.g., CPU, memory, etc.) of the nodes. For example, multiple VMs can operate on one physical machine (e.g., node host computer) running a single host operating system (e.g., host operating system $\mathbf{187}^{11}$, . . . , host operating system $\mathbf{187}^{1M}$), while the VMs run multiple applications on various respective guest operating systems. Such flexibility can be facilitated at least in part by a hypervisor (e.g., hypervisor $\mathbf{185}^{11}$, . . . , hypervisor $\mathbf{185}^{1M}$), which hypervisor is logically located between the various guest operating systems of the VMs and the host operating system of the physical infrastructure (e.g., node).

As an alternative, executable containers can be implemented at the nodes in an operating system-based virtualization environment or in a containerized virtualization environment. The executable containers are implemented at the nodes in an operating system virtualization environment or container virtualization environment. The executable containers can include groups of processes and/or resources (e.g., memory, CPU, disk, etc.) that are isolated from the node host computer and other containers. Such executable containers directly interface with the kernel of the host operating system (e.g., host operating system $\mathbf{187}_{11}$, . . . , host operating system $\mathbf{187}_{1M}$) without, in most cases, a hypervisor layer. This lightweight implementation can facilitate efficient distribution of certain software components, such as applications or services (e.g., micro-services). Any node of a distributed virtualization system can implement both a hypervisor-assisted virtualization environment and a container virtualization environment for various purposes. Also, any node of a distributed virtualization system can implement any one or more types of the foregoing virtualized controllers so as to facilitate access to storage pool 190 by the VMs and/or the executable containers.

Multiple instances of such virtualized controllers can coordinate within a cluster to form the distributed storage system 192 which can, among other operations, manage the storage pool 190. This architecture further facilitates efficient scaling in multiple dimensions (e.g., in a dimension of computing power, in a dimension of storage space, in a dimension of network bandwidth, etc.).

In some embodiments, a particularly configured instance of a virtual machine at a given node can be used as a virtualized controller in a hypervisor-assisted virtualization environment to manage storage and I/O (input/output or IO) activities of any number or form of virtualized entities. For example, the virtualized entities at node $\mathbf{181}_{11}$ can interface with a controller virtual machine (e.g., virtualized controller 18211) through hypervisor $\mathbf{185}^{11}$ to access data of storage pool 190. In such cases, the controller virtual machine is not formed as part of specific implementations of a given hypervisor. Instead, the controller virtual machine can run as a virtual machine above the hypervisor at the various node host computers. When the controller virtual machines run above the hypervisors, varying virtual machine architectures and/or hypervisors can operate with the distributed storage system 192. For example, a hypervisor at one node in the distributed storage system 192 might correspond to software from a first vendor, and a hypervisor at another node in the distributed storage system 192 might correspond to a second software vendor. As another virtualized controller implementation example, executable containers can be used to implement a virtualized controller (e.g., virtualized controller $\mathbf{182}_{1M}$) in an operating system virtualization environment at a given node. In this case, for example, the virtualized entities at node $\mathbf{181}_{1M}$ can access the storage pool 190 by interfacing with a controller container (e.g., virtualized controller $\mathbf{182}_{1M}$) through hypervisor $\mathbf{185}_{1M}$ and/or the kernel of host operating system $\mathbf{187}_{1M}$.

In some embodiments, one or more instances of an agent can be implemented in the distributed storage system 192 to facilitate the herein disclosed techniques. Specifically, agent $\mathbf{184}_{11}$ can be implemented in the virtualized controller $\mathbf{182}_{11}$, and agent $\mathbf{184}_{1M}$ can be implemented in the virtualized controller $\mathbf{182}_{1M}$. Such instances of the virtualized controller can be implemented in any node in any cluster. Actions taken by one or more instances of the virtualized controller can apply to a node (or between nodes), and/or to a cluster (or between clusters), and/or between any resources or subsystems accessible by the virtualized controller or the agents.

Exemplary Computer System

Figure 2:
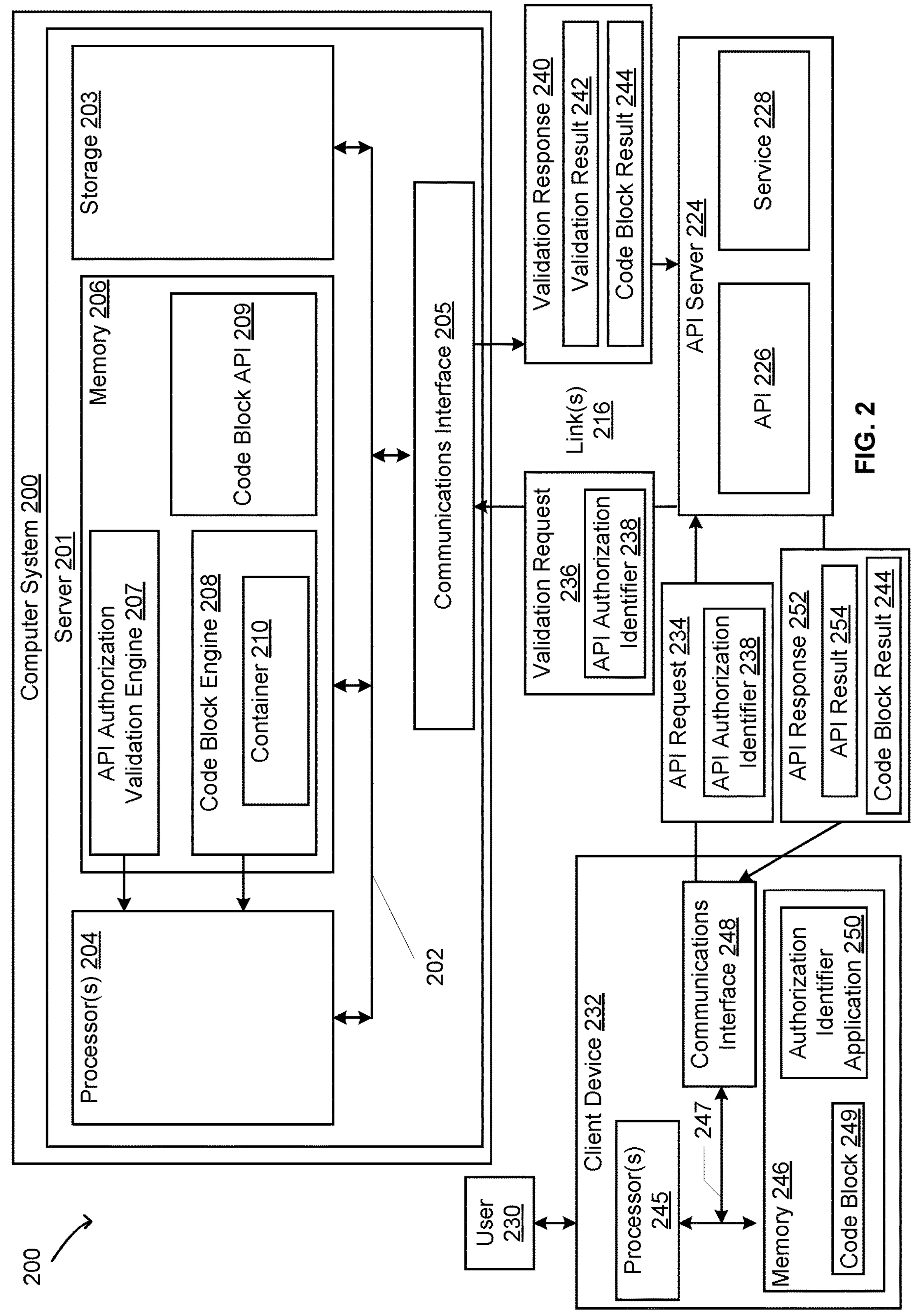
FIG. 2 is a block diagram illustrating a computer system configured to implement one or more aspects of the present embodiments.

FIG. 2 is a block diagram illustrating a computer system 200 configured to implement one or more aspects of the present embodiments. As shown, a server 201 within the computer system 200 includes, without limitation, a bus 202, storage 203, one or more processors 204, a communications interface 205, and a memory 206. Memory 206 includes, without limitation, an API authorization validation engine 207, a code block engine 208, and a code block API 209. Server 201 of FIG. 2 can be included in any of the virtualization system architectures shown in FIGS. 1A-1D.

The one or more processors 204 include any suitable processors implemented as a central processing unit (CPU), a graphics processing unit (GPU), an application-specific integrated circuit (ASIC), a field programmable gate array (FPGA), an artificial intelligence (AI) accelerator, any other type of processor, or a combination of different processors, such as a CPU configured to operate in conjunction with a GPU. In general, one or more processors 204 can be any technically feasible hardware unit capable of processing data and/or executing software applications.

Memory 206 includes a random-access memory (RAM) module, a flash memory unit, and/or any other type of memory unit or combination thereof. The one or more processors 204 and/or communications interface 205 are configured to read data from and write data to memory 206. Memory 206 includes various software programs that include one or more instructions that can be executed by the one or more processors 204 and application data associated with said software programs.

Storage 203 includes non-volatile storage for applications and data, and may include one or more fixed or removable disk drives, HDDs, SSD, NVMes, vDisks, flash memory devices, and/or other magnetic, optical, and/or solid-state storage devices.

The bus 202 interconnects subsystems and devices within server 201, such as storage 203, the one or more processors 204, communications interface 205 and memory 206. The computer system 200 described herein is illustrative and any other technically feasible configurations fall within the scope of the present disclosure. Further, in the context of this disclosure, the computing elements shown in the computer system 200 can correspond to a physical computing system (e.g., a system in a data center) or can include a virtual computing instance.

The computer system 200 is configured to communicate with an API server 224 that provides a service 228 through an API 226. The service 228 can include, for example, an information service that provides various types of information (e.g., news, weather forecasts, events arising within an infrastructure, and/or the like), an infrastructure monitoring service that monitors the performance of an infrastructure, a communication service that exchanges communication messages among one or more parties, and/or the like. API 226 can include, for example, a set of callable functions, where the functions perform various operations of the service 228 on behalf of one or more users 230 and/or client devices 232. API 226 defines a protocol that specifies a format of API requests 234 for operations to be performed by the service 228 and/or API responses 252 generated in response to such API requests 234. API server 224 can be included in any of the virtualization system architectures shown in FIGS. 1A-1D.

Client device 232 includes, without limitation, one or more processor(s) 245, a memory 246, and a communications interface 248. One or more processor(s) 245 include various types of processing units suitable for mobile or desktop environments, including but not limited to, a central processing unit (CPU) for general-purpose computing tasks, a graphics processing unit (GPU) for handling graphical computations and display, or a combination of both for enhanced performance, an application-specific integrated circuit (ASIC) or a field programmable gate array (FPGA) for tailored operations, and potentially an artificial intelligence (AI) accelerator for computational tasks, such as machine learning, data analysis, and/or the like. The one or more processor(s) 245 include any hardware capable of processing instructions and running the software necessary for the client device 232 to create API requests 234.

Memory 246 includes a random-access memory (RAM) module, a flash memory unit, and/or any other type of memory unit or combination thereof. In various embodiments, memory 246 includes a code block 249, which can be appended to an API authorization identifier, and an authorization identifier application 250. In various embodiments, authorization identifier application 250 includes a user interface, such as a graphical user interface (GUI), which assists user 230 in creating, managing, and appending code block 249 to API authorization identifier 238. In various embodiments, the API authorization identifier 238 is an authentication identifier, an API key, a session identifier, a token, or a security certificate. In various embodiments, the user interface of authorization identifier application 250 includes a text box into which code block 249 can be typed or pasted. In some embodiments, the user interface of authorization identifier application 250 includes an option for code block 249 to be loaded from a file, or an option for dragging and dropping a file onto the user interface, and/or the like. For example, authorization identifier application 250 can be similar to API user interface 300 described in further detail below with respect to FIG. 3. Using authorization identifier application 250, user 230 creates API authorization identifier 238 or selects an already existing API authorization identifier 238 and is given the option to append code block 249 to API authorization identifier 238. If user 230 decides not to add code block 249 to API authorization identifier 238, API authorization identifier 238 is saved for use in subsequent API requests. In various embodiments, if user 230 appends code block 249 to API authorization identifier 238, authorization identifier application 250 includes validation algorithms to validate code block 249. The validation algorithms can include one or more of validating an extension of a file, checking to see if the file is not larger than a threshold size, sanitizing the file to prevent directory traversal, checking the syntax of code block 249, checking to see that code block 249 includes only API calls on a white list of API function calls, validating an API call domain for code block 249, and/or the like. If the executable code block is not valid, an error is generated, and user 230 is prompted to edit code block 249 or select a different file. If code block 249 is valid, code block 249 is added or appended to API authorization identifier 238 and API authorization identifier 238 is saved for use in subsequent API requests. After the API authorization identifier 238 is saved, user 230 is given the option to create or select another API authorization identifier. API authorization identifier 238 is then supplied by client device 232 to API server 224 when making API request 234. Once the API server 224 responds with an API response 252, client device 232 receives API response 252. In various embodiments, authorization identifier application 250 provides additional processing of API response 252. For example, if API response 252 includes the results of a code block 249 execution, the authorization identifier application 250 can parse the results, transforming the results into a user-friendly format or triggering other processes within client device 232 based on the content of the output of code block 249.

The API server 224 receives an API request 234 from client device 232 to perform an operation involving the service 228. In various embodiments, the operation includes a request to retrieve information from the service 228, a request to store or change data stored by the service 228, a request to cause the API server 224 to transmit information to another server or device, and/or the like. The API request 234 is formatted as indicated by the API 226 (e.g., according to a data format, such as a variant of an extensible Markup Language (XML), JavaScript Object Notation (JSON), and/or the like). In various embodiments, the API server 224 performs initial validation of the API request 234 (e.g., verifying that the API request 234 is formatted as indicated by the API 226).

The API server 224 transmits a validation request 236 to the server 201 via one or more communication links 216. The validation request 236 transmitted by the API server 224 includes API authorization identifier 238. In various embodiments, the API authorization identifier 238 includes a key, a token, a certificate, and/or the like. In various embodiments, the API server 224 stores the API authorization identifier 238 and adds the API authorization identifier 238 to the API request 234 received from the client device 232. Additionally or alternatively, the API server 224 receives the API authorization identifier 238 in the API request 234 received from the client device 232. In various embodiments, the API authorization identifier 238 identifies the API server 224 (e.g., a regional API server 224 in a set of API servers providing a globalized service 228, such as a weather service). In various embodiments, the API authorization identifier 238 identifies the service 228 (e.g., a first service 228 provided by an API server 224 that also provides one or more additional services, wherein the API request 234 indicates the first service 228 instead of one of the one or more additional services). In various embodiments, the API authorization identifier 238 is included in a header of the validation request 236, or as part of a URL associated with the API request 234 and/or the validation request 236. For example, the URL associated with the API 226 (e.g., a URL called by the client device 232 to initiate the API request 234) includes a first portion that identifies the API server 224 and/or the service 228 and a second portion that identifies the user 230 and/or client device 232, such as a tenant ID.

The server 201 receives the validation request 236 via the communications interface 205. The server 201 validates the API authorization identifier 238 included in the validation request 236. As shown, the API authorization validation engine 207 is a program stored in memory 206 and executed by one or more processors 204 to validate the API authorization identifier 238 received in the validation request 236. In various embodiments, the API authorization validation engine 207 validates the API authorization identifier 238 by comparing an identifier of the API server 224 included in the validation request 236 with a stored cryptographic certificate that identifies the API server 224. In various embodiments, the API authorization validation engine 207 validates the API authorization identifier 238 by validating a cryptographic signature of an authorization identifier included in the validation request 236, where the authorization identifier indicates that the user 230 and/or the client device 232 is permitted to access the API 226 and/or the service 228. In various embodiments, the API authorization validation engine 207 validates the API authorization identifier 238 by validating an identity of the user 230 and/or the client device 232, where the identity is indicated by an identifier that is included in the validation request 236. Based on the validation of the API authorization identifier 238, the API authorization validation engine 207 generates a validation result 242 that indicates a result of the API authorization validation. In various embodiments, the validation result 242 includes either an indication that the user 230 and/or client device 232 is permitted to access the API 226 and/or the service 228 or an indication that the user 230 and/or client device 232 is not permitted to access the API 226 and/or the service 228. In various embodiments, the validation result 242 includes either an indication that an identity of the API server 224, the user 230, and/or the client device 232 was verified and/or an indication that an identity of the API server 224, the user 230, and/or the client device 232 was not verified. That is, the validation result 242 indicates whether or not the API request 234 should be fulfilled or denied, irrespective of a service tier of the user 230 and/or client device 232. In various embodiments, the validation result 242 includes either an API authorization validation success (e.g., an indication that the API authorization identifier was validated) or an API authorization validation failure (e.g., an indication that the API authorization identifier was not validated).

In various embodiments, when the validation result 242 indicates the API request 234 should be fulfilled and the validation request 236 includes an executable code block 249, the executable code block 249 is validated by a code block engine 208. Code block engine 208 extracts the executable code block 249 that has been appended to the API authorization identifier 238 and initiates a validation process, which ensures that code block 249 adheres to predefined security and operational protocols, preventing the execution of potentially harmful or unauthorized operations. In some embodiments, code block engine 208 checks the syntax of the code block 249 for errors. For example, if code block 249 is written in JavaScript, the engine ensures all brackets are correctly paired and semicolons are in place. In at least one embodiment, code block engine 208 scans code block 249 for unsafe patterns such as SQL injection points or unauthorized system calls. For example, code block engine 208 rejects a code snippet attempting to access the file system on API server 224 directly if such an operation is not explicitly permitted. In some embodiments, code block engine 208 analyzes the logic within the code block 249 to confirm the logic matches the expected functional outcomes, including without limitation, running code block 249 through a series of test cases to ensure code block 249 returns the correct data types or values under various conditions. For example, if code block 249 is intended to filter customer data by a specific criterion, code block 249 is tested to verify whether code block 249 accurately processes an array of customer objects. In various embodiments, code block engine 208 compares code block 249 operations against a whitelist of allowed functions and APIs. If code block 249 includes a call to an external API to retrieve sensitive data, such as fetch ('https://api.example.com/sensitive-data'), code block engine 208 can verify whether such an operation complies with privacy and access policies of authorization server 201. In some embodiments, code block engine 208 analyzes code block 249 for potential performance issues, such as unnecessary loops, expensive database queries, and/or the like, that can slow down authorization server 201. For example, if code block 249 contains a "for" loop that runs database queries, code block engine 208 checks if code block 249 can lead to a bottleneck. In some embodiments, validation of the code block includes determining whether a client (e.g., user 230 or an application being executed on client device 202) associated with API request 234 and API authorization identifier has exceeded a quota of a number of code blocks that can be executed over a time period.

Once code block 249 passes the validation, code block engine 208 executes code block 249. Execution of code block 249 can include one or more calls to code block API 209, which provides an interface for code block 249 to perform the intended functions, including but not limited to, data processing, additional authentication steps, or other tasks as defined by the user in code block 249. Code block result 244 includes but is not limited to compilation or run-time errors or execution results. Code block result 244 is captured by code block engine 208 and is then added to validation result 242 from API authorization validation engine 207 into validation response 240. Validation response 240 is communicated back through communications link(s) 216 to API server 224.

In various embodiments, code block engine 208 includes a container 210. Container 210 is an isolated virtual environment designed to execute user-defined code blocks, such as code block 249, safely and efficiently. Container 210, as managed by code block engine 208, ensures that when a validation request 236 is received with an API authorization identifier 238 which includes a code block 249, the execution of code block 249 occurs in isolation from the core operational processes of server 201. The isolation maintains the security and operational integrity of server 201. For example, code block engine 208 can activate container 210 to run a fraud detection script and/or the like. By executing within container 210, the fraud detection script can analyze code block 249 using the data provided without the risk of affecting primary functions or accessing unauthorized data of server 201. Once the execution of code block 249 is complete, code block result 244 is added to validation result 242.

The communications interface 205 of the server 201 transmits the validation response 240 to the API server 224 by the one or more communication links 216. Based on the validation result 242 included in the validation response 240, the API server 224 determines whether or not to perform one or more operations of the service 228 indicated in the API request 234 and/or a manner in which one or more operations of the service 228 are to be performed. The API server 224 generates API result 254 included in API response 252 based on the operations performed (or not performed) by service 228 in response to the API request 234 received from the client device 232. API result 254 includes various fields and includes different types of data depending on the API request made, including but not limited to, a confirmation message indicating successful data retrieval or update, such as a JSON object confirming a successful transaction with fields like {"status": "success", "transactionId": "abc123"}, detailed data requested from a database, which can be an array of records, such as customer information, transaction histories, product details, and/or the like, formatted as a JSON array: [{"customerId": "001", "name": "John Doe", "purchases": 45}, . . . ], an error message if API request 234 could not be completed, which can look like {"error": true, "message": "Invalid request parameters"}. The API response 252 further includes the code block result 244 when the validation response 240 includes the code block result 244.

The API server 224 transmits the API response 252 to the client device 232 to fulfill the API request 234.

Figure 3:
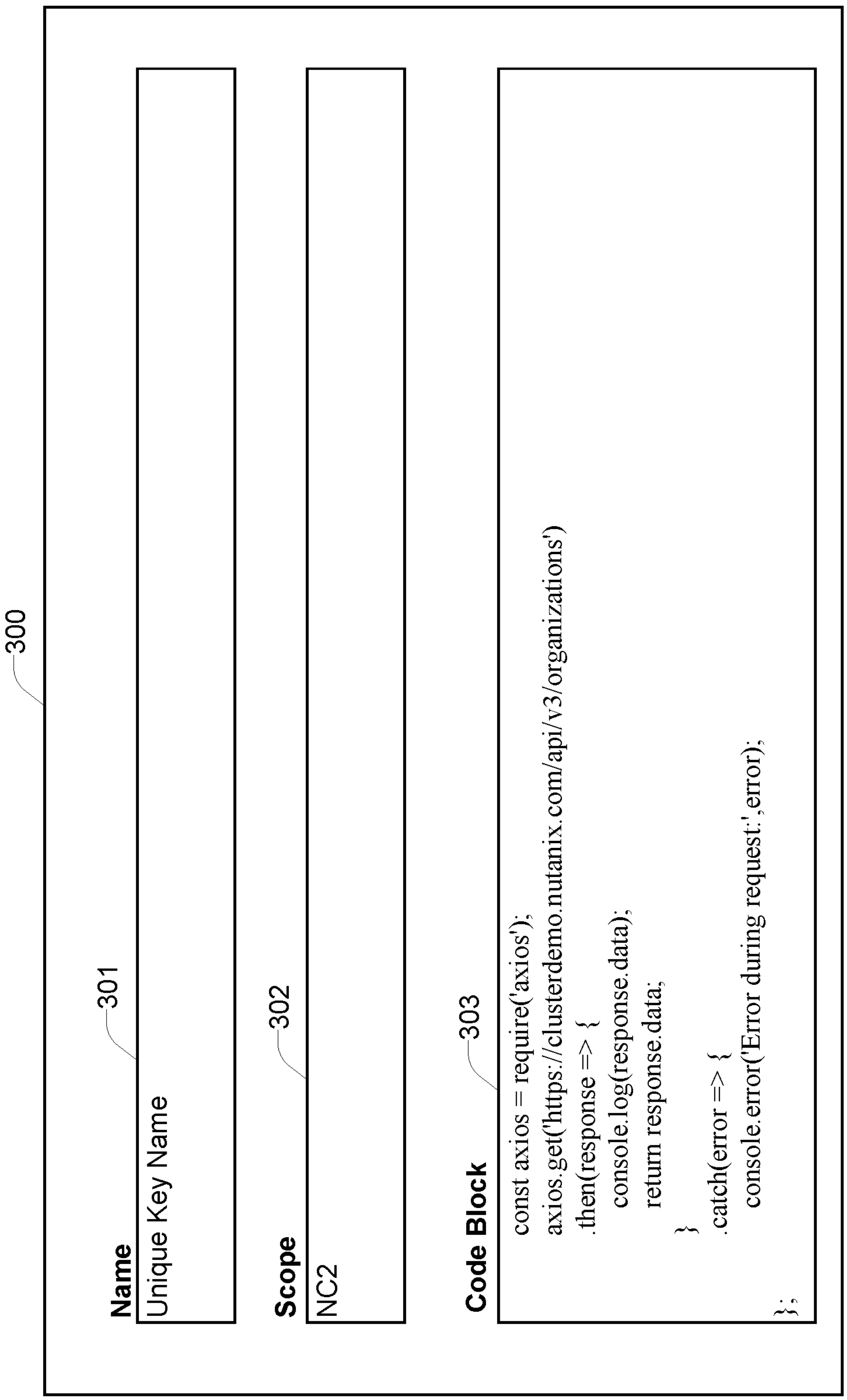
FIG. 3 illustrates an example of an API user interface for augmenting an API authorization identifier, according to various embodiments.

FIG. 3 illustrates an example of an API user interface 300 for augmenting an API authorization identifier, according to various embodiments. API user interface 300 includes, without limitation, an authorization identifier name field 301, a scope field 302, and a code block field 303. In various embodiments, API user interface 300 is implemented by authorization identifier application 250 in order to facilitate the appending of a code block (e.g., code block 249) to an API authorization identifier (e.g., API authorization identifier 238).

Authorization identifier name field 301 displays a user-defined label that uniquely identifies an API authorization identifier. Authorization identifier name field 301 is a unique reference for users, such as user 230, to identify and differentiate between multiple API authorization identifiers. For example, a user managing API authorization identifiers for a cloud service can name one key "DataRetrieval Key" for an API authorization identifier intended to access database retrieval endpoints, while another authorization identifier can be named "UserAuth_Key" designated for authentication processes. In some embodiments, authorization identifier name field 301 is editable to allow user 230 to change the name used to identify the API authorization identifier.

Scope field 302 displays the scope or reach of the API authorization identifier. Scope field 302 specifies the areas of the API server 224 that the API authorization identifier can access, setting boundaries for the use of the API authorization identifier. For example, as shown in FIG. 3, scope field 302 identifies that API authorization identifier 238 is limited for use in cluster NC2. In some embodiments, scope field 302 is editable to allow user 230 to change the scope or reach of the API authorization identifier.

Code block field 303 allows user 230 to input code block 249 that user 230 would like to have executed in conjunction with validation of the API authorization identifier (e.g., API authorization identifier 238) by an authorization server, such as server 201. User 230 types or pastes a code block (e.g., code block 249) into code block field 303. In some embodiments, user 230 uploads code block 249 from a file, or drags and drops a file onto code block field 303, and/or the like. Code block field 303 contains a script in any interpretable language, such as Python, Java, and/or the like, for computer system 200, which user 230 has the option to choose from. The script in code block field 303 can include one or more API calls requesting additional business data from authorization server 201, a routine for logging usage statistics, or any other function that enhances the utility of the API authorization identifier 238. For example, user 230 can enter JavaScript code in code block field 303 to execute a data formatting routine that converts and sanitizes incoming data before being processed by the API server 224, thus ensuring that the data adheres to the expected format and content standards. For example, as shown in FIG. 3, code block field 303 can be a JavaScript for accessing information about an Axios (a popular HTTP client to make a network request) instance. and log the data to client device 232. If an error occurs during the request, the error is caught and printed to client device 232. However, other functions and/or code can be used in code block field 303 to access other types of business data and metadata.

Figure 4:
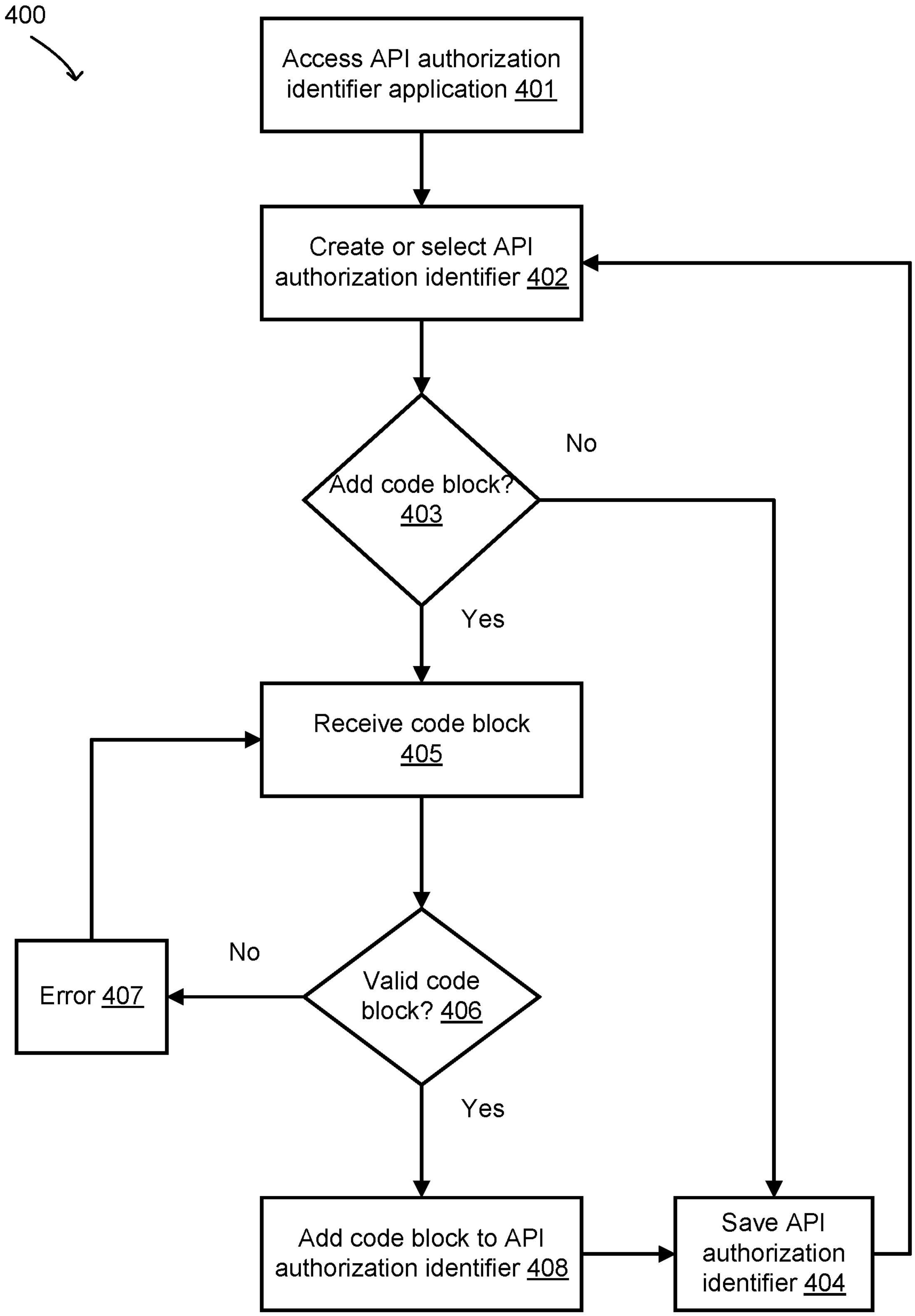
FIG. 4 is a flow diagram of method steps for augmenting an API authorization identifier, according to various embodiments.

FIG. 4 is a detailed flowchart illustrating the example process of creating and augmenting an API authorization identifier 238, according to the various embodiments. Although the method steps are described in conjunction with FIGS. 1-3, persons skilled in the art will understand that any system configured to perform the method steps, in any order, falls within the scope of the present invention.

As shown in FIG. 4, a method 400 begins at step 401, where user 230 accesses authorization identifier application 250 on client device 232. For example, user 230 can run authorization identifier application 250 using any technically feasible technique.

At step 402, user 230 either creates a new API authorization identifier 238 or selects an existing one. For example, user 230 inputs the unique name corresponding to API authorization identifier 238 into authorization identifier name field 301 in FIG. 3. Alternatively, user 230 can select, where a unique name is assigned to an API authorization identifier 238. In some embodiments, authorization identifier application 250 includes a drop down field or an auto-fill option to facilitate user 230 to select an API authorization identifier 238 for a list of existing authorization identifiers or select to have a new authorization identifier created.

At step 403, user 230 chooses whether to add a code block 249 to API authorization identifier 238. If user 230 chooses not to add code block 249, the method advances to step 404 and user 230 saves API authorization identifier 238. If user 230 chooses to add code block 249, the method proceeds to step 405.

As step 405, a code block is received. For example, as shown in FIG. 3, user 230 can either enter a code block 249 in API user interface 300, upload a code block 249 from a file, drag and drop a code block 249 file, and/or the like. Code block 249 can be in interpretable language for computer system 200, such as Python, HTML, Java, and/or the like.

At step 406, authorization identifier application 250 checks whether code block 249 received during step 405 is valid. In at least one embodiment, authorization identifier application 250 checks an extension of a file, checking to see if the file is not larger than a threshold size, checking the file to prevent directory traversal, checking the syntax of code block 249, checking to see that code block 249 includes only API calls on a white list of API function calls, checking an API call domain for code block 249, and/or the like. If code block 249 is not valid, the method proceeds to step 407 where an error is sent to user 230 and the method returns to step 405. If code block 249 is valid, the method proceeds to step 408.

At step 408, code block 249 is added to API authorization identifier 238. For example, as seen in FIG. 3, code block 249 can include a Javascript for accessing information about an Axios instance. Code block 249 can include one or more API calls requesting additional business data from API server 224, a routine for logging usage statistics, or any other function that enhances the utility of the API authorization identifier 238. The method then proceeds to step 404 where user 230 saves API authorization identifier 238. Finally, the method returns to step 402 where user 230 creates or selects API authorization identifier 238 on client device 232.

Figure 5:
FIG. 5 illustrates an example of an API authentication result, according to various embodiments.

FIG. 5. illustrates an example of an API authentication result 500, according to various embodiments. API authentication result 500 is an example of validation response 240 which includes validation result 242 and code block result 244. API authentication result 500 is a JSON response from an API validation process as embodied in a POST response 501. API authentication result 500 includes, without limitation, a validation result 502 and a code block result 503.

Validation result 502 includes the output from API authorization validation engine 207. Validation result 502 includes several elements. The first element, "success", indicates a Boolean value true, signifying that the API authorization identifier has been validated by the API authorization validation engine 207 successfully. "name" indicates the name of the API authorization identifier, here named "NC2 Scripted". "scope" indicates the scope of the API authorization identifier, which is "Cloud". "subscope" indicates further granularity within the scope, specified as "NC2", referring to cluster NC2. "tenantUUID" provides a unique identifier for the tenant, suggesting a multi-tenant environment. "email" indicates an email address associated with user 230 of the API authorization identifier. "iss" indicates the issuer of the API authorization identifier, which is a unique identifier for the issuing authority. "status" indicates the current status of the API authorization identifier, which is "used" in the example API authentication result 500.

Code block result 503 is a nested object within the JSON structure and includes the output from code block engine 208 based on the validation and/or execution of the code block appended to the API authorization identifier. Code block result 503 includes several elements. The first element, "created_at" indicates the timestamp of when the code block result was generated. The element "customer_id" provides a unique identifier for a user, possibly indicating which user data was accessed or affected by the API call. "name" provides a string value, which can be related to the name of the code block or a function within code block that was executed.

Figure 6:
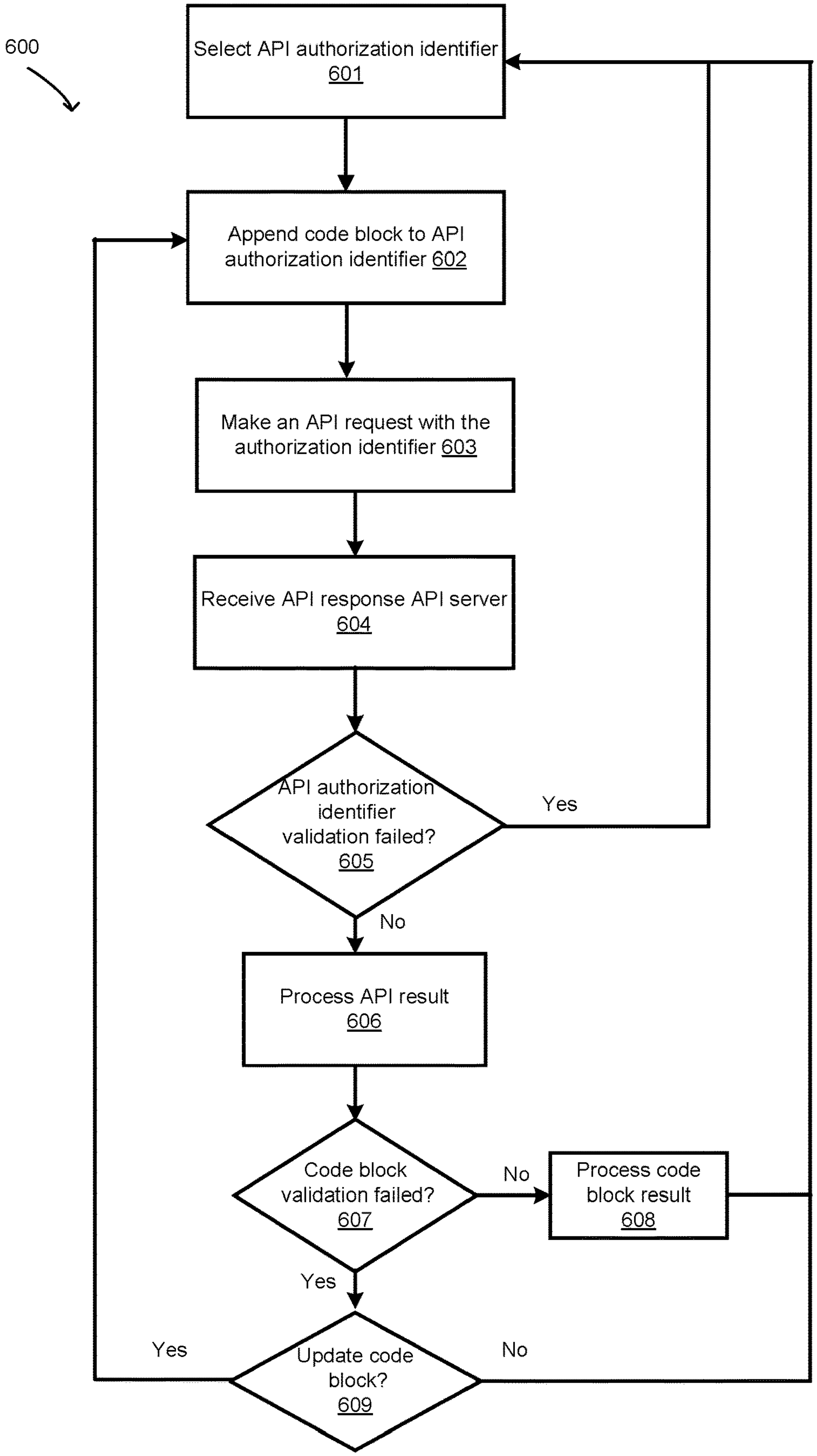
FIG. 6 is a flow diagram of method steps for making an API request and processing an API response, according to various embodiments.

FIG. 6 is a flow diagram of method steps for making an API request 234 and processing an API response 252, according to various embodiments. Although the method steps are described in conjunction with FIGS. 1-5, persons skilled in the art will understand that any system configured to perform the method steps, in any order, falls within the scope of the present invention.

A method 600 begins with step 601, where user 230 selects an API authorization identifier 238. For example, user 230 can use authorization identifier application 250 to select or type an API authorization identifier 238. For example, as shown in FIG. 3, user 230 can select a unique identifier name field 301 from an API user interface 300. In some embodiments, authorization identifier application 250 includes a drop down list or a an auto-complete, such as predictive text fields, option to facilitate the API authorization identifier 238 selection.

At step 602, user 230 adds a code block 249 to API authorization identifier 238. User 230 uses authorization identifier application 250 on client device 232 to add code block 249. For example, code block 249 can be added using techniques consistent with step 405. In some embodiments, steps 601 and/or 602 can be performed prior to and/or while coding an application that will be making one or more API calls.

At step 603, client device 232 makes an API request 234 with API authorization identifier 238. Processor(s) 245 of the client device 232 assembles API request 234 by including API authorization identifier 238, and if applicable, appended code block 249. Memory 246 aids in the assembly by providing temporary storage for both API authorization identifier 238 and code block 249 as API authorization identifier 238 and code block 249 are being integrated into an API request 234. Communications interface 248 then transmits API request 234. Communications interface 248 manages the network protocols necessary for the secure and accurate delivery of the API request 234. In various embodiments, API request 234 includes various parameters and headers that define the nature and scope of API request 234, including but not limited to, specific data queries, commands for data manipulation, or requests for system status updates that are handled by the service 228. The parameters are encoded, often in a format such as JSON, XML, SOAP, and/or the like, to ensure compatibility with the API 226 defined by API server 224.

At step 604, client device 232 receives API response 252 from API server 224. API response 252 includes an API result 254 and a code block result 244 when API request 234 includes code block 249.

At step 605, client device 232 checks whether API authorization identifier 238 validation has failed. If API authorization identifier 238 validation has failed, the method returns to step 601 prompting user 230 to select a new API authorization identifier on client device 232. If API authorization identifier 238 validation has not failed, the method proceeds to step 606.

At step 606, client device 232 processes API result 254. For example, if the API result 254 is a dataset, client device 232 displays the data in a user-friendly format, such as populating a table in a finance app with the latest stock prices. If API result 254 includes a confirmation of a successful update, such as {"updateStatus": "complete", "itemUpdated": "profileInfo"}, client device 232 can notify the user with a success message or refresh the relevant screen to reflect the new information. Additionally, if API result 254 includes executable code output, such as analytics results or computed metrics, client device 232 uses code output to adjust operational parameters, update predictive models, or guide user decision-making with insights, such as trend data, statistical analyses, and/or the like.

At step 607, client device 232 checks whether code block 249 validation has failed. If code block 249 validation has not failed, the method proceeds to step 607. If code block 249 validation has failed, the method proceeds to step 608.

At step 608, client device 232 processes code block result 244. Code block result 244 includes but is not limited to compilation or run-time errors or execution results of code block 249. The code executing on client device 232 that made API request 234 interprets API response 252. In various embodiments, API response 252 is parsed to transform API response 252 into a user-friendly format or triggering other processes within client device 232 based on the content of the output of code block 249 if a code block 249 was appended to API authorization identifier 238. API result 254 includes various forms and include different types of data depending on the API call made, including but not limited to, a confirmation message indicating successful data retrieval or update, such as a JSON object confirming a successful transaction with fields like {"status": "success", "transactionId": "abc123"}, detailed data requested from a database, which can be an array of records, such as customer information, transaction histories, product details, and/or the like, formatted as a JSON array: [{"customerId": "001", "name": "John Doe", "purchases": 45}, . . . ], an error message if API request 234 could not be completed, which can look like {"error": true, "message": "Invalid request parameters"}. For example, as shown in FIG. 5, code block result 503 can be a nested object within the JSON structure, which includes several elements. The method then repeats by returning to step 601.

At step 609, user 230 chooses whether to update code block 249 using client device 232 or not. If user 230 chooses to update code block 249 using client device 232, the method proceeds to step 602 prompting user 230 to update code block 249. If user 230 chooses not to update code block 249 using client device 232, the method proceeds to step 601, where user 230 selects another API authorization identifier.

Figure 7:
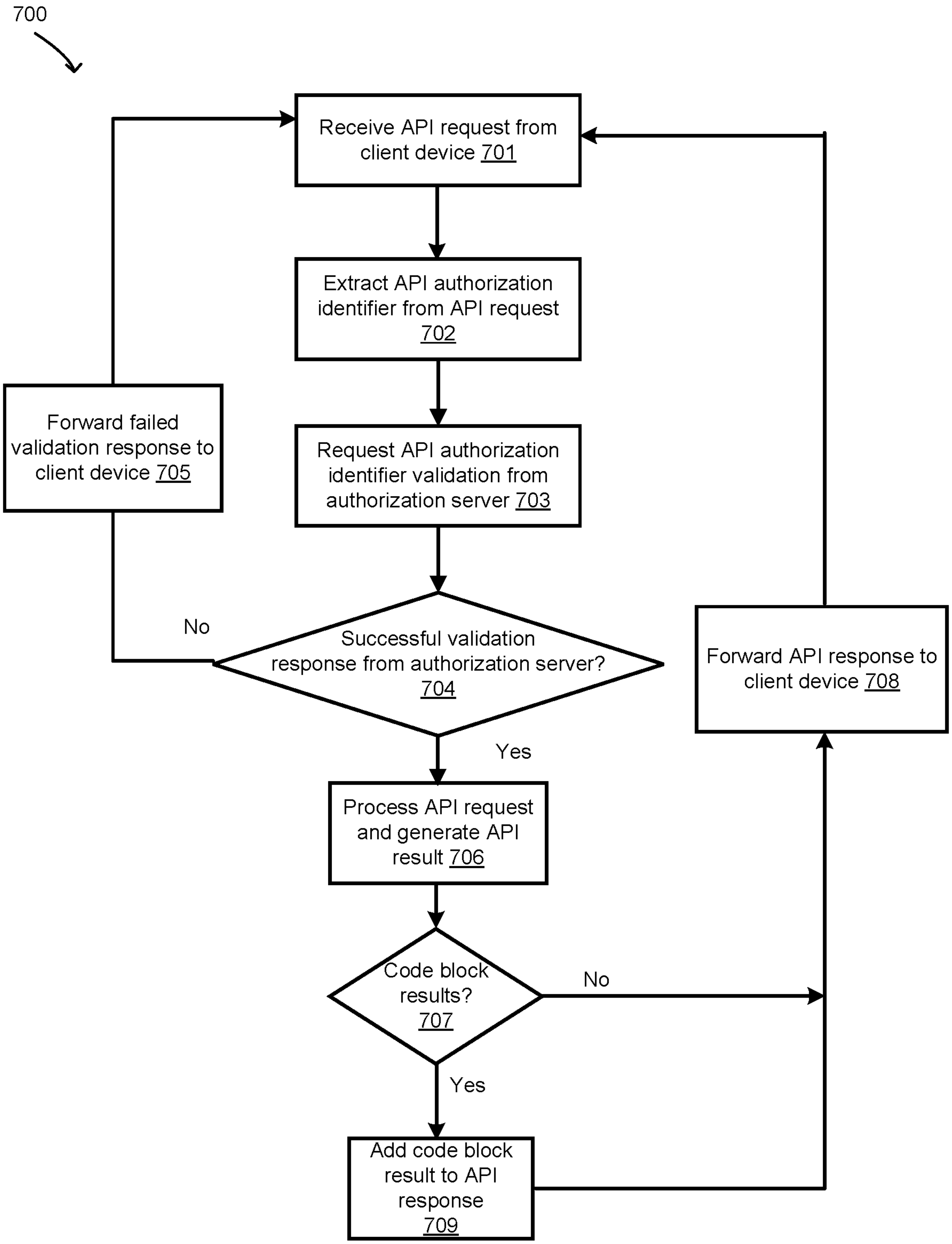
FIG. 7 is a flow diagram of method steps for processing an API request, according to various embodiments.

FIG. 7 is a flow diagram of method steps for processing an API request 234, according to various embodiments. Although the method steps are described in conjunction with FIGS. 1-6, persons skilled in the art will understand that any system configured to perform the method steps, in any order, falls within the scope of the present invention.

A method 700 begins at step 701, where API server 224 receives API request 234 from client device 232. The API request 234 is formatted as indicated by the API 226 (e.g., according to a data format, such as a variant of XML, JSON, and/or the like). In various embodiments, the API server 224 carries out initial validation of the API request 234 (e.g., verifying that the API request 234 is formatted as indicated by the API 226).

At step 702, API server 224 extracts API authorization identifier 238 from API request 234. The extracted API authorization identifier 238 can include an appended code block 249. In various embodiments, API authorization identifier 238 manifests as a key, token, or certificate and is included in API request 234 either as part of the payload received from client device 232, as an authorization identifier that the API server 224 has on record, can identify API server 224, particularly if it operates within a network of servers, or API authorization identifier 238 can specify the particular service 228 being accessed.

At step 703, API server 224 requests API authorization identifier 238 validation from authorization server 201. API server 224 creates a validation request 236, which includes API authorization identifier 238. Validation request 236 is transmitted using one or more communication link(s) 216 to server 201. API authorization identifier 238 is typically embedded in the header or structured into the URL of validation request 236, aiding the authorization server 201 in recognizing the request's origin and intended service 228. The embedded information, possibly including a tenant ID or other unique user-related identifiers, enables the authorization server 201 to validate the credentials and authorize the necessary access to the requested service 228.

At step 704, API server 224 checks whether a successful validation response 240 is received from authorization server 201. Validation response 240 is transmitted using one or more communication link(s) 216. API server 224 checks validation result 242 included in validation response 240. In various embodiments, validation result 242 indicates whether user 230 or client device 232 is authorized to access API 226 and the associated service 228. Validation result 242 affirms permission to proceed with API request 234 or, conversely, denies access based on API authorization identifier 238 provided. Validation response 240 classifies the validation outcome by server 201 as either a validation success, confirming that API authorization identifier 234 has been authenticated and the request can be fulfilled, or a validation failure, indicating that API authorization identifier 238 cannot be authenticated and, as such, API request 234 is denied. If validation response 240 indicates authentication success the method proceeds to step 706. If validation response 240 indicates authentication failure the method proceeds to step 705

At step 705, API server 224 forwards failed validation response 240 to client device 232 as a part of API response 252. In various embodiments, API response 252 includes an error message, which can look like {"error": true, "message": "Invalid request parameters"}. The method then returns to step 701 waiting to receive an API request 234 from client device 232.

At step 706, API server 224 processes API request 234 and generates API result 254. API result 254 is included in API response 252 based on the operations performed (or not performed) by service 228 in response to API request 234 received from client device 232. API result 254 includes various forms and include various types of data depending on the API call made, which includes without limitation, a confirmation message indicating successful data retrieval or update, such as a JSON object confirming a successful transaction with fields like {"status": "success", "transactionId": "abc123"}, detailed data requested from a database, which can be an array of records, such as customer information, transaction histories, product details, and/or the like, formatted as a JSON array: [{"customerId": "001", "name": "John Doe", "purchases": 45}, . . . ].

At step 707, API server 224 checks whether validation response 240 includes code block result 244. If validation response 240 includes no code block result 244, the method proceeds to step 708. If validation response 240 includes a code block result 244, the method proceeds to step 709.

At step 708, API server 224 forwards API response 252 to client device 232. The method then returns to step 701 waiting to receive an additional API request.

At step 709, API server 224 adds code block result 244 to API response 252. In various embodiments, code block result 244 includes compilation or run-time errors, execution results, and/or the like. The method then proceeds to step 708.

Figure 8:
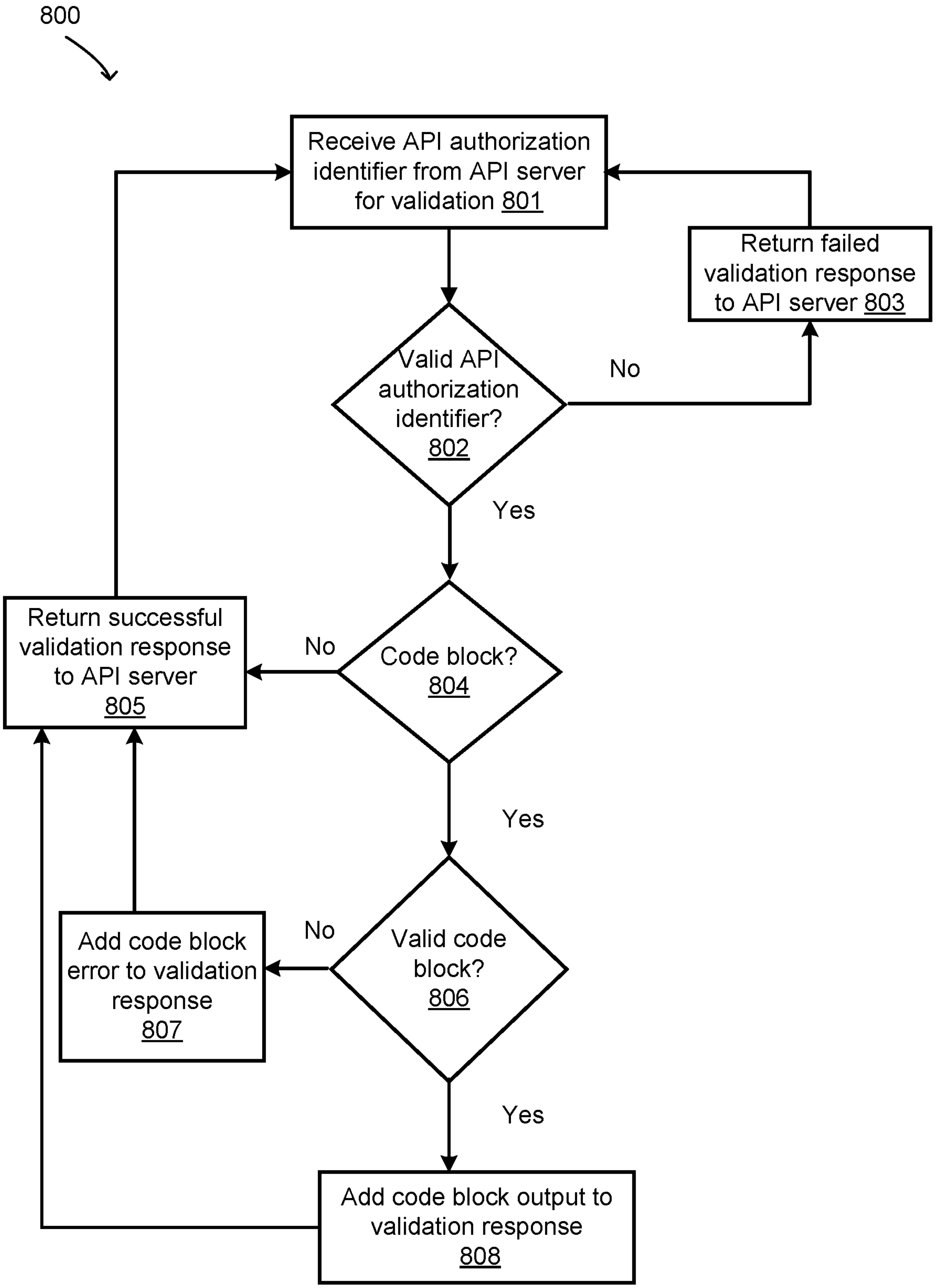
FIG. 8 is a flow diagram of method steps for validating an API authorization identifier, according to various embodiments.

FIG. 8 is a flow diagram of method steps for validating an API authorization identifier 238, according to various embodiments. Although the method steps are described in conjunction with FIGS. 1-7, persons skilled in the art will understand that any system configured to perform the method steps, in any order, falls within the scope of the present invention.

A method 800 begins at step 801, where server 201 receives API authorization identifier 238 from API server 224 for validation. Communication interface 205 of server 201 receives a validation request 236, which includes an API authorization identifier 238, from one or more communication link(s) 216. Validation request 236 is transmitted to API authorization validation engine 207 included in memory 206 for validation.

At step 802, server 201 checks whether API authorization identifier 238 is valid. Server 201 uses API authorization validation engine 207 to check whether API authorization identifier 238 is valid. In various embodiments, API authorization validation engine 207 in server 201 validates the API authorization identifier 238 using several approaches, including but not limited to, comparing the identifier of the API server 224, included in the validation request 236, with a pre-stored cryptographic certificate specific to API server 224, verifying the cryptographic signature attached to API authorization identifier 238, which serves as a proof that the user 230 or client device 232 is authorized to access API 226 and service 228, examining specific identifiers contained within validation request 236. If server 201 determines that API authorization identifier 238 is not valid, the method proceeds to step 803. If server 201 determines that API authorization identifier 238 is valid, the method proceeds to step 804.

At step 803, server 201 returns failed validation response 240 to API server 224. In various embodiments, validation response 240 includes an error message, which can, for example, look like {"error": true, "message": "Invalid request parameters"}. Validation response 240 is transmitted using one or more communication link(s) 216. In various embodiments, validation response 240 indicates that user 230 or client device 232 is not authorized to access API 226 and the associated service 228. Validation response 240 denies permission to proceed denies access to service 228 based on API authorization identifier 238 provided. The method then returns to step 801 to receive a new API authorization identifier for validation.

At step 804, server 201 checks whether a code block is appended to API authorization identifier 238. If a code block is not appended, the method proceeds to step 805. If a code block is appended, the method proceeds to step 806.

At step 805, server 201 returns successful validation response 240 to API server 224. For example, in FIG. 5, a successful validation response 240 is shown in 502. Validation response 240 is transmitted using one or more communication link(s) 216. In various embodiments, validation response 240 indicates that user 230 or client device 232 is authorized to access API 226 and the associated service 228. Validation response 240 affirms permission to access service 228 based on API authorization identifier 238 provided. The method then returns to step 801 to receive a new API authorization identifier for validation.

At step 806, server 201 checks whether code block 249 appended to API authorization identifier 238 is valid. Server 201 uses code block engine 208 to validate the code block 249 appended to API authorization identifier 238. Code block engine 208 first extracts and checks the syntax of code block 249 for errors, such as incorrect bracket pairing, missing semicolons in a JavaScript script, and/or the like. Beyond syntax, code block engine 208 checks code block 249 for security risks, rejecting unsafe patterns, such as SQL injections, unauthorized system calls, and/or the like. In at least one embodiment, code block engine 208 assesses the logical flow of the code block 249, running code block 249 through test scenarios to verify that code block 249 processes data as intended, such as filtering customer records correctly. Code block engine 208 checks the operations within code block 249 against a whitelist of allowed functions and API calls, ensuring compliance with privacy and access policies of server 201. In some embodiments, code block engine 208 evaluates code block 249 for potential performance issues, such as resource-intensive loops or database queries. If code block 249 is not valid, the method proceeds to step 807. If the code block is valid, the method proceeds to step 808. In some embodiments, code block engine 208 determines whether a client (e.g., user 230 or an application being executed on client device 202) associated with API request 234 and API authorization identifier has exceeded a quota of a number of code blocks that can be executed over a time period.

At step 807, server 201 adds code block error to validation response 240. The code block error is included in code block result 244, which can include compilation or run-time errors. Code block result 244 is then captured by code block engine 208 and is added to validation result 242 from API authorization validation engine 207 into validation response 240. The method then proceeds to step 805.

At step 808, server 201 adds code block output to validation response 240. Code block engine 208 executes code block 249 within a specialized virtual environment, container 210, to ensure isolation and security. The execution of code block 249 can include making calls to the code block API 209, allowing code block 249 to perform various intended functions such as data processing, conducting additional authentication steps, executing specific tasks defined by the user 230, and/or the like. As code block 249 operates within container 210, any outcomes, including the results of the execution, are captured in code block result 244. For example, as shown in FIG. 5, code block output can be code block result 503. The method then proceeds to step 805.

In sum, the disclosed techniques allow users to append executable code to authorization identifiers. The user or client selects a specific authorization identifier and appends a customizable code block, written in a programming language supported by the authorization server. When an API call is made to an API server using the authorization identifier, the API server forwards the authorization identifier to an authorization server. Following successful authentication of the authorization identifier, the authorization server validates the code block in the authorization identifier and, upon successful validation, executes the code block. The outputs or logs from executing the code block are then appended to validation response sent to the API server. The API server then returns the outputs or logs in response to the API call.

At least one technical advantage of the disclosed techniques over the prior art is that, with the disclosed techniques, API authorization identifiers are able to include executable code blocks. The techniques allow for a more efficient interaction between the user and the authorization server, by facilitating direct and complex data requests within a single API call. After implementation, the disclosed techniques allow the user to bypass the multiple API calls conventionally required for different data accesses, streamlining the data retrieval process and significantly reducing the network and server load. Further, the disclosed techniques allow for an API management, which introduces a means for real-time data processing within the authorization process. These technical advantages represent one or more technological improvements over prior art approaches.

1. In some embodiments, one or more non-transitory computer-readable media storing program instructions that, when executed by one or more processors of an authorization server, cause the one or more processors to perform a method comprising receiving, from an application programming interface (API) server, an authorization request, the authorization request including an API authorization identifier, determining whether the API authorization identifier is valid, and in response to determining that the API authorization identifier is valid executing a code block in the API authorization identifier, adding an output generated by the execution of the code block to a response to the authorization request, and returning the response to the API server.

2. The one or more non-transitory computer-readable media of clause 1, wherein the output generated by the executing of the code block includes business data of a client associated with the API authorization identifier.

3. The one or more non-transitory computer-readable media of clauses 1 or 2, wherein executing the code block comprises executing the code block within a container instance.

4. The one or more non-transitory computer-readable media of any of clauses 1-3, wherein the method further comprises validating the code block before executing the code block.

5. The one or more non-transitory computer-readable media of any of clauses 1-4, wherein the method further comprises in response to the code block failing the validating, adding a code block error to the response to the authorization request.

6. The one or more non-transitory computer-readable media of any of clauses 1-5, wherein validating the code block comprises validating a syntax of the code block.

7. The one or more non-transitory computer-readable media of any of clauses 1-6, wherein validating the code block comprises determining that each function call in the code block is included in a white list of permitted function calls.

8. The one or more non-transitory computer-readable media of any of clauses 1-7, wherein validating the code block comprises determining whether a client associated with the API authorization identifier has exceeded a quota of a number of code blocks that can be executed over a time period.

9. The one or more non-transitory computer-readable media of any of clauses 1-8, wherein the method further comprises in response to the API authorization identifier failing the validating, returning an error to the API server.

10. The one or more non-transitory computer-readable media of any of clauses 1-9, wherein the API authorization identifier is provided by a client requesting access to a service provided by the API server.

11. The one or more non-transitory computer-readable media of any of clauses 1-10, wherein the output generated by the executing of the code block is added to a response returned to a client that provided the API authorization identifier.

12. In some embodiments, a computer-implemented method of processing an authorization request, the computer-implemented method comprises receiving, from an application programming interface (API) server, an authorization request, the authorization request including an API authorization identifier, determining whether the API authorization identifier is valid, and in response to determining that the API authorization identifier is valid executing a code block in the API authorization identifier, adding an output generated by the execution of the code block to a response to the authorization request, and returning the response to the API server.

13. The computer-implemented method of clause 12, wherein the output generated by the executing of the code block includes business data of a client associated with the API authorization identifier.

14. The computer-implemented method of clauses 12 or 13, wherein executing the code block comprises executing the code block within a container instance.

15. The computer-implemented method of any of clauses 12-14, further comprising validating the code block before executing the code block.

16. The computer-implemented method of any of clauses 12-15, further comprising in response to the code block failing the validating, adding a code block error to the response to the authorization request.

17. The computer-implemented method of any of clauses 12-16, wherein validating the code block comprises validating a syntax of the code block.

18. The computer-implemented method of any of clauses 12-17, wherein validating the code block comprises determining that each function call in the code block is included in a white list of permitted function calls.

19. The computer-implemented method of any of clauses 12-18, wherein validating the code block comprises determining whether a client associated with the API authorization identifier has exceeded a quota of a number of code blocks that can be executed over a time period.

20. The computer-implemented method of any of clauses 12-19, further comprising in response to the API authorization identifier failing the validating, returning an error to the API server.

21. The computer-implemented method of any of clauses 12-20, wherein the API authorization identifier is provided by a client requesting access to a service provided by the API server.

22. The computer-implemented method of any of clauses 12-21, wherein the output generated by the executing of the code block is added to a response returned to a client that provided the API authorization identifier.

23. In some embodiments, a system comprises a memory storing instructions, and one or more processors coupled to the memory and, when executing the instructions, are configured to perform operations comprising receiving, from an application programming interface (API) server, an authorization request, the authorization request including an API authorization identifier, determining whether the API authorization identifier is valid, and in response to determining that the API authorization identifier is valid executing a code block in the API authorization identifier, adding an output generated by the execution of the code block to a response to the authorization request, and returning the response to the API server.

24. The system of clause 23, wherein the output generated by the executing of the code block includes business data of a client associated with the API authorization identifier.

25. The system of clauses 23 or 24, wherein executing the code block comprises executing the code block within a container instance.

26. The system of any of clauses 23-25, wherein the operations further comprise validating the code block before executing the code block.

27. The system of any of clauses 23-26, wherein the operations further comprise in response to the code block failing the validating, adding a code block error to the response to the authorization request.

28. The system of any of clauses 23-27, wherein validating the code block comprises validating a syntax of the code block.

29. The system of any of clauses 23-28, wherein validating the code block comprises determining that each function call in the code block is included in a white list of permitted function calls.

30. The system of any of clauses 23-29, wherein validating the code block comprises determining whether a client associated with the API authorization identifier has exceeded a quota of a number of code blocks that can be executed over a time period.

31. The system of any of clauses 23-30, wherein the operations further comprise in response to the API authorization identifier failing the validating, returning an error to the API server.

32. The system of any of clauses 23-31, wherein the API authorization identifier is provided by a client requesting access to a service provided by the API server.

33. The system of any of clauses 23-32, wherein the output generated by the executing of the code block is added to a response returned to a client that provided the API authorization identifier.

34. In some embodiments, one or more non-transitory computer-readable media store program instructions that, when executed by one or more processors of a client device cause the one or more processors to perform a method comprising selecting an API authorization identifier, adding an executable code block to the API authorization identifier, transmitting an application programming interface (API) request to an API server, receiving a response from the API server, the response including output from execution of the executable code block, and processing the output from the execution of the executable code block.

35. The one or more non-transitory computer-readable media of clause 34, wherein the method further comprises validating the executable code block before adding the executable code block to the API authorization identifier.

36. The one or more non-transitory computer-readable media of clauses 34 or 35, wherein validating the executable code block comprises validating a syntax of the executable code block.

37. The one or more non-transitory computer-readable media of any of clauses 34-36, wherein validating the executable code block comprises determining that each function call in the executable code block is included in a white list of permitted function calls.

38. The one or more non-transitory computer-readable media of any of clauses 34-37, wherein validating the executable code block comprises determining that the executable code block is not larger than a threshold size.

39. The one or more non-transitory computer-readable media of any of clauses 34-38, wherein the executable code block comprises one or more function calls for accessing an API provided by an authorization server.

40. The one or more non-transitory computer-readable media of any of clauses 34-39, wherein the API provides access to business data of a client supplying the API authorization identifier.

41. The one or more non-transitory computer-readable media of any of clauses 34-40, wherein the API authorization identifier is an authentication identifier, an API key, a session identifier, a token, or a security certificate.

42. In some embodiments, a computer-implemented method of using an application programming interface (API), the computer-implemented method comprises selecting an API authorization identifier, adding an executable code block to the API authorization identifier, transmitting an API request to an API server, receiving a response from the API server, the response including output from execution of the executable code block, and processing the output from the execution of the executable code block.

43. The computer-implemented method of clause 42, further comprising validating the executable code block before adding the executable code block to the API authorization identifier.

44. The computer-implemented method of clauses 42 or 43, wherein validating the executable code block comprises validating a syntax of the executable code block.

45. The computer-implemented method of any of clauses 42-44, wherein validating the executable code block comprises determining that each function call in the executable code block is included in a white list of permitted function calls.

46. The computer-implemented method of any of clauses 42-45, wherein validating the executable code block comprises determining that the executable code block is not larger than a threshold size.

47. The computer-implemented method of any of clauses 42-46, wherein the executable code block comprises one or more function calls for accessing an API provided by an authorization server.

48. The computer-implemented method of any of clauses 42-47, wherein the API provides access to business data of a client supplying the API authorization identifier.

49. The computer-implemented method of any of clauses 42-48, wherein the API authorization identifier is an authentication identifier, an API key, a session identifier, a token, or a security certificate.

50. In some embodiments, a system comprises a memory storing instructions, and one or more processors coupled to the memory and, when executing the instructions, are configured to perform operations comprising selecting an API authorization identifier, adding an executable code block to the API authorization identifier, transmitting an API request to an API server, receiving a response from the API server, the response including output from execution of the executable code block, and processing the output from the execution of the executable code block.

51. The system of clause 50, wherein the operations further comprise validating the executable code block before adding the executable code block to the API authorization identifier.

52. The system of clauses 50 or 51, wherein validating the executable code block comprises validating a syntax of the executable code block.

53. The system of any of clauses 50-52, wherein validating the executable code block comprises determining that each function call in the executable code block is included in a white list of permitted function calls.

54. The system of any of clauses 50-53, wherein validating the executable code block comprises determining that the executable code block is not larger than a threshold size.

55. The system of any of clauses 50-54, wherein the executable code block comprises one or more function calls for accessing an API provided by an authorization server.

56. The system of any of clauses 50-55, wherein the API provides access to business data of a client supplying the API authorization identifier.

57. The system of any of clauses 50-56, wherein the API authorization identifier is an authentication identifier, an API key, a session identifier, a token, or a security certificate.

58. In some embodiments, an application programming interface (API) authorization identifier comprises an authorization key, and a block of executable code.

59. The API authorization identifier of clause 58, wherein the API authorization identifier is an authentication identifier, an API key, a session identifier, a token, or a security certificate.

Any and all combinations of any of the claim elements recited in any of the claims and/or any elements described in this application, in any fashion, fall within the contemplated scope of the present disclosure and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. One or more non-transitory computer-readable media storing program instructions that, when executed by one or more processors of an authorization server, cause the one or more processors to perform a method comprising:
- receiving, from an application programming interface (API) server, an authorization request, the authorization request including an API authorization identifier, the API authorization identifier comprising an authentication identifier and an executable code block separate from the authentication identifier;
- determining whether the API authorization identifier is valid based on the authentication identifier; and
- in response to determining that the API authorization identifier is valid:
  - executing the executable code block;
  - adding an output generated by the execution of the executable code block to a response to the authorization request; and
  - returning the response to the API server.

2. The one or more non-transitory computer-readable media of claim 1, wherein the output generated by the executing of the executable code block includes business data of a client associated with the API authorization identifier.

3. The one or more non-transitory computer-readable media of claim 1, wherein executing the executable code block comprises executing the executable code block within a container instance.

4. The one or more non-transitory computer-readable media of claim 1, wherein the method further comprises validating the executable code block before executing the executable code block.

5. The one or more non-transitory computer-readable media of claim 4, wherein the method further comprises in response to the executable code block failing the validating, adding a code block error to the response to the authorization request.

6. The one or more non-transitory computer-readable media of claim 4, wherein validating the executable code block comprises validating a syntax of the executable code block.

7. The one or more non-transitory computer-readable media of claim 4, wherein validating the executable code block comprises determining that each function call in the executable code block is included in a white list of permitted function calls.

8. The one or more non-transitory computer-readable media of claim 4, wherein validating the executable code block comprises determining whether a client associated with the API authorization identifier has exceeded a quota of a number of executable code blocks that can be executed over a time period.

9. The one or more non-transitory computer-readable media of claim 1, wherein the method further comprises in response to the API authorization identifier failing the validating, returning an error to the API server.

10. The one or more non-transitory computer-readable media of claim 1, wherein the API authorization identifier is provided by a client requesting access to a service provided by the API server.

11. The one or more non-transitory computer-readable media of claim 1, wherein the output generated by the executing of the executable code block is added to a response returned to a client that provided the API authorization identifier.

12. The one or more non-transitory computer-readable media of claim 1, wherein the authentication identifier is a key, a token, or a certificate.

13. A computer-implemented method of processing an authorization request, the computer-implemented method comprising:

receiving, from an application programming interface (API) server, an authorization request, the authorization request including an API authorization identifier, the API authorization identifier comprising an authentication identifier and an executable code block separate from the authentication identifier;

determining whether the API authorization identifier is valid based on the authentication identifier; and in response to determining that the API authorization identifier is valid:

executing the executable code block in the API authorization identifier;

adding an output generated by the execution of the executable code block to a response to the authorization request; and returning the response to the API server.

14. The computer-implemented method of claim 13, wherein the output generated by the executing of the executable code block includes business data of a client associated with the API authorization identifier.

15. The computer-implemented method of claim 13, wherein executing the executable code block comprises executing the executable code block within a container instance.

16. The computer-implemented method of claim 13, further comprising validating the executable code block before executing the executable code block.

17. The computer-implemented method of claim 16, further comprising in response to the executable code block failing the validating, adding a code block error to the response to the authorization request.

18. The computer-implemented method of claim 16, wherein validating the executable code block comprises validating a syntax of the executable code block.

19. The computer-implemented method of claim 16, wherein validating the executable code block comprises determining that each function call in the executable code block is included in a white list of permitted function calls.

20. The computer-implemented method of claim 16, wherein validating the executable code block comprises determining whether a client associated with the API authorization identifier has exceeded a quota of a number of code blocks that can be executed over a time period.

21. The computer-implemented method of claim 13, further comprising in response to the API authorization identifier failing the validating, returning an error to the API server.

22. The computer-implemented method of claim 13, wherein the API authorization identifier is provided by a client requesting access to a service provided by the API server.

23. The computer-implemented method of claim 13, wherein the output generated by the executing of the executable code block is added to a response returned to a client that provided the API authorization identifier.

24. The method of claim 13, wherein the authentication identifier is a key, a token, or a certificate.

25. A system comprising:

a memory storing instructions; and one or more processors coupled to the memory and, when executing the instructions, are configured to perform operations comprising:

receiving, from an application programming interface (API) server, an authorization request, the authorization request including an API authorization identifier, the API authorization identifier comprising an authentication identifier and an executable code block separate from the authentication identifier;

determining whether the API authorization identifier is valid based on the authentication identifier; and in response to determining that the API authorization identifier is valid:

executing the executable code block in the API authorization identifier;

adding an output generated by the execution of the executable code block to a response to the authorization request; and returning the response to the API server.

26. The system of claim 25, wherein the output generated by the executing of the executable code block includes business data of a client associated with the API authorization identifier.

27. The system of claim 25, wherein executing the executable code block comprises executing the executable code block within a container instance.

28. The system of claim 25, wherein the operations further comprise validating the executable code block before executing the executable code block.

29. The system of claim 28, wherein the operations further comprise in response to the executable code block failing the validating, adding a code block error to the response to the authorization request.

30. The system of claim 28, wherein validating the executable code block comprises validating a syntax of the executable code block.

31. The system of claim 28, wherein validating the executable code block comprises determining that each function call in the executable code block is included in a white list of permitted function calls.

32. The system of claim 28, wherein validating the executable code block comprises determining whether a client associated with the API authorization identifier has exceeded a quota of a number of code blocks that can be executed over a time period.

33. The system of claim 25, wherein the operations further comprise in response to the API authorization identifier failing the validating, returning an error to the API server.

34. The system of claim 25, wherein the API authorization identifier is provided by a client requesting access to a service provided by the API server.

35. The system of claim 25, wherein the output generated by the executing of the executable code block is added to a response returned to a client that provided the API authorization identifier.

36. The system of claim 25, wherein the authentication identifier is a key, a token, or a certificate.

* * * * *